US007803959B2

(12) United States Patent
Coggan et al.

(10) Patent No.: US 7,803,959 B2
(45) Date of Patent: Sep. 28, 2010

(54) SYNTHESIS OF AROMATIC SILICON-CONTAINING COMPOUNDS

(75) Inventors: Jennifer A. Coggan, Cambridge (CA); Timothy P. Bender, Toronton (CA); Alan Edward John Toth, Burlington (CA)

(73) Assignee: Xerox Corporation, Norwalk, CT (US)

( * ) Notice: Subject to any disclaimer, the term of this patent is extended or adjusted under 35 U.S.C. 154(b) by 686 days.

(21) Appl. No.: 11/278,769

(22) Filed: Apr. 5, 2006

(65) Prior Publication Data

US 2007/0238039 A1 Oct. 11, 2007

(51) Int. Cl.
*C07F 7/18* (2006.01)

(52) U.S. Cl. ....................................... 556/446; 556/466

(58) Field of Classification Search ................. 556/446, 556/466

See application file for complete search history.

(56) References Cited

U.S. PATENT DOCUMENTS

| | | | | |
|---|---|---|---|---|
| 4,265,990 | A | 5/1981 | Stolka et al. | |
| 6,335,414 | B1 * | 1/2002 | Sakamoto et al. | 528/34 |
| 6,730,448 | B2 | 5/2004 | Yoshino et al. | |
| 2004/0086794 | A1 | 5/2004 | Yamada et al. | |
| 2005/0234272 | A1 | 10/2005 | Goodbrand et al. | |

FOREIGN PATENT DOCUMENTS

| | | |
|---|---|---|
| JP | A-57-128344 | 8/1982 |
| JP | B2-60-022347 | 6/1985 |
| JP | A-63-065449 | 3/1988 |
| JP | A-04-015659 | 1/1992 |
| JP | B2-05-047104 | 7/1993 |

OTHER PUBLICATIONS

Fischer et al. {Advance Synthesis & Catalysis (2005), 347(10), pp. 1329-1332; abstract only}.*
U.S. Appl. No. 10/938,887, filed Sep. 13, 2004, Bender et al.
U.S. Appl. No. 10/992,690, filed Nov. 22, 2004, Bender et al.
U.S. Appl. No. 10/992,687, filed Nov. 22, 2004, Bender et al.
U.S. Appl. No. 10/992,658, filed Nov. 22, 2004, Goodbrand et al.
U.S. Appl. No. 10/998,585, filed Nov. 30, 2004, Bender et al.
U.S. Appl. No. 11/034,062, filed Jan. 13, 2005, Qi et al.
U.S. Appl. No. 11/034,713, filed Jan. 14, 2005, Qi et al.
U.S. Appl. No. 11/073,548, filed Mar. 8, 2005, Tong et al.
U.S. Appl. No. 11/094,683, filed Mar. 31, 2005, Goodbrand et al.
U.S. Appl. No. 11/234,275, filed Sep. 26, 2005, Dinh et al.
U.S. Appl. No. 11/246,127, filed Oct. 11, 2005, Bender.
U.S. Appl. No. 11/263,671, filed Nov. 1, 2005, Coggan et al.
U.S. Appl. No. 11/267,336, filed Nov. 7, 2005, Bender et al.
U.S. Appl. No. 11/295,134, filed Dec. 13, 2005, Yanus et al.

* cited by examiner

*Primary Examiner*—Elvis O Price
(74) *Attorney, Agent, or Firm*—Oliff & Berridge, PLC

(57) ABSTRACT

Methods are provided for preparing aromatic silicon-containing compounds. The methods include providing an aromatic starting material; reacting the aromatic starting material with a base to form an aromatic salt; and reacting the aromatic salt with a halo-alkylene-silane to form an aromatic silicon-containing compound. Compositions prepared by these methods, protective layers that include hydrolysis and condensation products of such compositions, electrophotographic photoreceptors that include such protective layers, and image forming apparatuses that include such electrophotographic photoreceptors are also provided. In addition, method for preparing electrophotographic photoreceptors that include protective layers including hydrolysis and condensation products of aromatic silicon-containing compounds prepared by the methods for preparing aromatic silicon-containing compounds are provided.

26 Claims, 4 Drawing Sheets

SYNTHESIS OF AROMATIC SILICON-CONTAINING COMPOUNDS

TECHNICAL FIELD

This disclosure relates generally to improved chemical processes for the synthesis of aromatic silicon-containing compounds, and to the use of such aromatic silicon-containing compounds in producing overcoat layers for electrophotographic imaging members. The present disclosure relates specifically to efficient, scalable methods of making such aromatic silicon-containing compounds, electrophotographic photoreceptors, process cartridges, and image forming apparatuses.

RELATED APPLICATIONS

Commonly assigned, U.S. patent application Ser. No. 10/709,193 filed Apr. 20, 2004, describes a process for preparing an aryl iodide compound, comprising: reacting an aryl halide compound with a metal iodide, a metal catalyst and a catalyst coordinating ligand in at least one solvent to form an aryl iodide; and purifying the aryl iodide; wherein the solvent is heated to reflux during the reacting; wherein an aryl iodide yield of at least about 75% is obtained; and wherein the aryl iodide has a purity of at least 90%.

Commonly assigned, U.S. patent application Ser. No. 10/938,887 filed Sep. 13, 2004, describes a silicon layer for electrophotographic photoreceptors comprising one or more siloxane-containing compound; and an antioxidant; wherein the antioxidant is at least one selected from the group consisting of hindered phenol antioxidants, hindered amine antioxidants, thioether antioxidants and phosphite antioxidants.

Commonly assigned, U.S. patent application Ser. No. 10/992,690 filed Nov. 22, 2004, describes a process for forming a tertiary arylamine compound, comprising reacting an arylbromide and an arylamine. For example, the application describes a process for forming N,N-diphenyl-4-aminobiphenyl, comprising reacting 4-bromobiphenyl and diphenylamine in the presence of a palladium-ligated catalyst.

Commonly assigned, U.S. patent application Ser. No. 10/992,687 filed Nov. 22, 2004, describes a process for forming a 4-aminobiphenyl derivative arylamine compound, comprising: (i) providing a first disubstituted 4-aminobiphenyl compound; (ii) optionally formylating the first disubstituted 4-aminobiphenyl compound to form a bisformyl substituted compound, where the first disubstituted 4-aminobiphenyl compound is not a bisformyl substituted compound; (iii) acidifying the bisformyl substituted compound to convert formyl functional groups into acid functional groups to form an acidified compound; and (iv) hydrogenating the acidified compound to saturate at least one unsaturated double bonds in the acidified compound, wherein there is provided a second disubstituted 4-aminobiphenyl compound.

Commonly assigned, U.S. patent application Ser. No. 10/992,658 filed Nov. 22, 2004, describes a process for forming a 4-aminobiphenyl derivative arylamine compound, comprising: (i) providing an iodinated organic compound; (ii) substituting the iodinated organic compound at carboxylic acid groups thereof to provide ester protecting groups; (iii) conducting an Ullman condensation reaction to convert the product of step (ii) into an arylamine compound; and (iv) conducting a Suzuki coupling reaction to add an additional phenyl group to the arylamine compound in the 4-position relative to the nitrogen, to provide the 4-aminobiphenyl derivative arylamine compound.

Commonly assigned, U.S. patent application Ser. No. 10/998,585 filed Nov. 30, 2004, describes a silicon-containing layer for electrophotographic photoreceptors comprising: one or more siloxane-containing compound; and one or more siloxane-containing antioxidant; wherein the siloxane-containing antioxidant is at least one member selected from the group consisting of hindered-phenol antioxidants, hindered-amine antioxidants, thioether antioxidants and phosphite antioxidants.

Commonly assigned, U.S. patent application Ser. No. 11/034,062 filed Jan. 13, 2005, describes an aromatic silicon-containing compound, having the formula (I): Ar—[X-L-$SiR_n(OR')_{3-n}]_m$ (I) wherein: Ar represents an aromatic group; X represents a divalent or trivalent group; L represents a divalent linking group; R represents a hydrogen atom, an alkyl group or an aryl group; R' represents an alkyl group having 1 to 5 carbon atoms; n is an integer of from 0 to 2; and m is an integer of from 1 to 5.

Commonly assigned, U.S. patent application Ser. No. 11/034,713 filed Jan. 14, 2005, describes an electrophotographic photoreceptor comprising a charge-generating layer, a charge-transport layer, and an overcoat layer comprised of a crosslinked siloxane composite composition comprising at least one siloxane-containing compound and metal oxide particles.

Commonly assigned, U.S. patent application Ser. No. 11,073,548 filed Mar. 8, 2005, describes an imaging member comprising: a substrate, a charge generating layer, a charge transport layer, and an external overcoating layer comprising an electron conductive material.

Commonly assigned, U.S. patent application Ser. No. 11/094,683 filed Mar. 31, 2005, describes a process for forming an anhydrous alkali earth salt of a dicarboxylic acid of an arylamine compound, comprising reacting a dicarboxylic acid of an arylamine compound with an anhydrous alkali earth salt. The application also discloses a process for forming a siloxane-containing hole-transport molecule, comprising: reacting a dicarboxylic acid of an arylamine compound with an anhydrous alkali earth salt to form an anhydrous dicarboxylic acid salt of the arylamine compound; and reacting the anhydrous dicarboxylic acid salt of the arylamine compound with a siloxane-containing compound.

Commonly assigned, U.S. patent application Ser. No. 11/234,275 filed Sep. 26, 2005, describes an electrophotographic imaging member comprising: a substrate, a charge generating layer, a charge transport layer, and an overcoating layer, said overcoating layer comprising a cured polyester polyol or cured acrylated polyol film forming resin and a charge transport material.

Commonly assigned, U.S. patent application Ser. No. 11/246,127 filed Oct. 11, 2005, describes a silicon-containing layer comprising sol-gel polymerization products of a mixture of siloxane precursor materials that comprises one or more siloxane-containing compounds, one or more disilanol compounds and one or more alcohols.

Commonly assigned, U.S. patent application Ser. No. 11/263,671 filed Nov. 1, 2005, describes a process for the preparation of a tertiary arylamine compound, comprising reacting an arylhalide and an arylamine in an ionic liquid in the presence of a catalyst.

Commonly assigned, U.S. patent application Ser. No. 11/267,336 filed Nov. 7, 2005, describes an interpenetrating network comprising an organic siloxane-containing material and a polymeric binder material.

Commonly assigned, U.S. patent application Ser. No. 11/295,134 filed Dec. 13, 2005, describes an electrophotographic imaging member comprising: a substrate, a charge generating layer, a charge transport layer, and an overcoating layer, said overcoating layer comprising a terphenyl arylamine dissolved or molecularly dispersed in a polymer binder.

The appropriate components and process aspects of each of the foregoing, such as the aromatic silicon-containing compounds and electrophotographic imaging members, may be selected for the present disclosure in embodiments thereof. The entire disclosures of the above-mentioned applications are totally incorporated herein by reference.

REFERENCES

JP-A-63-65449 (the term "JP-A" as used herein means an "unexamined published Japanese patent application"), discloses an electrophotographic photoreceptor in which fine silicone particles are added to a photosensitive layer, and also discloses that such addition of the fine silicone particles imparts lubricity to a surface of the photoreceptor.

Further, in forming a photosensitive layer, a method has been proposed in which a charge transport substance is dispersed in a binder polymer or a polymer precursor thereof, and then the binder polymer or the polymer precursor thereof is cured. JP-B-5-47104 (the term "JP-B" as used herein means an "examined Japanese patent publication") and JP-B-60-22347, disclose electrophotographic photoreceptors using silicone materials as the binder polymers or the polymer precursors thereof.

Furthermore, in order to improve mechanical strength of the electrophotographic photoreceptor, a protective layer is formed on the surface of the photosensitive layer in some cases. A cross-linkable resin is used as a material for the protective layer in many cases. However, the protective layer formed by the cross-linkable resin acts as an insulating layer, which impairs the photoelectric characteristics of the photoreceptor. For this reason, a method of dispersing a fine conductive metal oxide powder (JP-A-57-128344) or a charge-transport substance (JP-A-4-15659) in the protective layer and a method of reacting a charge-transport substance having a reactive functional group with a thermoplastic resin to form the protective layer have been proposed.

However, even the above-mentioned conventional electro-photo-graphic photoreceptors are not necessarily sufficient in electrophotographic characteristics and durability, particularly when used in combination with a charger of the contact-charging system (contact charger) or a cleaning apparatus, such as a cleaning blade.

Further, when a photoreceptor is used in combination with a contact charger and a toner obtained by chemical polymerization (polymerization toner), a surface of the photoreceptor may become stained with a discharge product produced in contact charging or with polymerization toner that remains after a transport step. This staining can deteriorate image quality in some cases. Still further, use of a cleaning blade to remove discharge product or remaining toner adhered to the photoreceptor surface increases friction and abrasion between the surface of the photoreceptor and the cleaning blade, resulting in a tendency to cause damage to the surface of the photoreceptor, breakage of the blade or turning up of the blade.

Furthermore, in producing a photoreceptor, in addition to improvement in electrophotographic characteristics and durability, reducing production costs becomes an important problem. However, conventional electrophotographic photoreceptors also may have problems relating to coating defects such as orange peel appearances and hard spots.

The use of silicon-containing compounds in photoreceptor layers, including in photosensitive and protective layers, has been shown to increase the mechanical lifetime of electrophotographic photoreceptors, under charging conditions and scorotron charging conditions. For example, U.S. patent application Publication US 2004/0086794 to Yamada et al. discloses a photoreceptor having improved mechanical strength and stain resistance.

However, the above-mentioned conventional electrophotographic photoreceptor is not necessarily sufficient in electrophotographic characteristics and durability, particularly when such a photoreceptor is used in an environment of high heat and humidity.

Photoreceptors having low wear rates, such as those described in Yamada, also have low refresh rates. The low wear and refresh rates are a primary cause of image-deletion errors, particularly under conditions of high humidity and high temperature. U.S. Pat. No. 6,730,448 B2 to Yoshino et al. addresses this issue, disclosing photoreceptors having some improvement in image quality, fixing ability, even in an environment of high heat and humidity. However, there still remains a need for electrophotographic photoreceptors having high mechanical strength and improved electrophotographic characteristics and improved image deletion characteristics even under conditions of high temperature and high humidity.

The disclosures of each of the foregoing patents and publications, and the disclosures of any patents and publications cited below, are hereby totally incorporated by reference. The appropriate components and process aspects of the each of the cited patents and publications may also be selected for the present compositions and processes in embodiments thereof.

BACKGROUND

In electrophotography, an electrophotographic substrate containing a photoconductive insulating layer on a conductive layer is imaged by first uniformly electrostatically charging a surface of the substrate. The substrate is then exposed to a pattern of activating electromagnetic radiation, such as, for example, light. The light or other electromagnetic radiation selectively dissipates the charge in illuminated areas of the photoconductive insulating layer while leaving behind an electrostatic latent image in non-illuminated areas of the photoconductive insulating layer. This electrostatic latent image is then developed to form a visible image by depositing finely divided electroscopic marking particles on the surface of the photoconductive insulating layer. The resulting visible image is then transferred from the electrophotographic substrate to a necessary member, such as, for example, an intermediate transfer member or a print substrate, such as paper. This image-developing process can be repeated as many times as necessary with reusable photoconductive insulating layers.

Image forming apparatus such as copiers, printers and facsimiles, including electrophotographic systems for charging, exposure, development, transfer, etc., using electrophotographic photoreceptors have been widely employed. In such image-forming apparatus, there are ever-increasing demands for improving the speed of the image-forming processes, improving image quality, miniaturizing and prolonging the life of the apparatus, reducing production and running costs, etc. Further, with recent advances in computers and communication technology, digital systems and color-image output systems have been applied also to image-forming apparatus.

Electrophotographic imaging members (i.e. photoreceptors) are well known. Photoreceptors having either a flexible belt or a rigid drum configuration are commonly used in electrophotographic processes. Photoreceptors may comprise a photoconductive layer including a single layer or composite layers. These photoreceptors take many different forms. For example, layered photo-responsive imaging members are known in the art. U.S. Pat. No. 4,265,990 to Stolka et al., which is incorporated herein by reference in its entirety, describes a layered photoreceptor having separate photo-generating and charge-transport layers. The photo-generating layer disclosed in the 990 patent is capable of photo-generating holes and injecting the photo-generated holes into the charge-transport layer. Thus, in the photoreceptors of the 990 patent, the photo-generating material generates electrons and holes when subjected to light.

More advanced photoconductive photoreceptors containing highly specialized component layers are also known. For example, multilayered photoreceptors may include one or more of a substrate, an undercoating layer, an intermediate layer, an optional hole- or charge-blocking layer, a charge-generating layer (including a photo-generating material in a binder) over an undercoating layer and/or a blocking layer, and a charge-transport layer (including a charge-transport material in a binder). Additional layers, such as one or more overcoat layer or layers, may be included as well.

In view of such a background, improvement in electrophotographic properties and durability, miniaturization, reduction in cost, etc., in photoreceptors have been studied, and photoreceptors using various materials, including cross-linked siloxane materials, have been proposed.

However, there are shortcomings associated with cross-linked siloxane-containing overcoat layers. In particular, electrical charges can migrate from the photoreceptor surface into the porous cross-linked siloxane-containing overcoat, and cause image problems. Another shortcoming associated with the siloxane-containing overcoat layers is the high torque required to rotate the coated photoreceptor against a cleaning blade. In addition, because the silicon hard overcoat layers are typically prepared by sol-gel processes, shrinkage of the applied layer occurs, which strains the resulting materials. Although attempts have been made to solve these problems by modifying various component materials, such modifications typically present trade-offs in terms of improving one property while deteriorating another property.

By providing an aromatic silicon-containing compound, which can be incorporated into new cross-linked siloxane-containing outmost protective layers such as for use in electrophotographic photoreceptors, these problems may be overcome. Such aromatic silicon-containing compound provides such benefits as high rigidity and good compatibility with hole transport molecules typically used in cross-linked siloxane-containing overcoat layers. Cross-linked siloxane-containing protective layers and electrophotographic photoreceptors formed using the aromatic silicon-containing compound in turn show improved micro-mechanical properties, such as low torque, higher wear resistance, and the like, and improved and sustained performance in deletion resistance.

However, use of such aromatic silicon-containing compounds in cross-linked siloxane-containing outermost protective layers has been limited by the methods used to prepare such compounds. Typically, useful aromatic silicon-containing compounds are prepared on a small scale, in processes that include difficult purification procedures. These processes have low yields of crude products that contain impurities and oligomers that must be removed by tedious, non-scalable purification procedures.

Thus, there still remains a need for improved methods for preparing aromatic silicon-containing compounds that will produce high yields of the desired aromatic silicon-containing compounds, and there remains a need for efficient, scalable methods for preparing the aromatic silicon-containing compounds.

SUMMARY

The present disclosure addresses these and other needs, by providing a one-pot, two-step method of preparing aromatic silicon-containing compounds from aromatic alcohols.

Exemplary processes include methods for preparing aromatic silicon-containing compounds, comprising: providing an aromatic starting material; reacting the aromatic starting material with a base to form an aromatic salt; and reacting the aromatic salt with a halo-alkylene-silane to form an aromatic silicon-containing compound.

Exemplary compositions include aromatic silicon-containing compounds prepared by methods that comprise providing an aromatic starting material; reacting the aromatic starting material with a base to form an aromatic salt; and reacting the aromatic salt with a halo-alkylene-silane to form an aromatic silicon-containing compound. Exemplary protective layers comprise the hydrolysis and condensation product of such aromatic silicon-containing products.

Exemplary image forming apparatuses include electophotographic photoreceptors comprising a charge generating layer, a charge transport layer, and an outmost protective layer comprising a crosslinked siloxane composition, wherein said crosslinked siloxane composition is a product of the hydrolysis and condensation of at least one aromatic silicon-containing compound prepared by methods that comprise providing an aromatic starting material; reacting the aromatic starting material with a base to form an aromatic salt; and reacting the aromatic salt with a halo-alkylene-silane to form an aromatic silicon-containing compound.

Exemplary methods for preparing electrophotographic photoreceptors include providing a substrate; forming an underlayer on said substrate; forming a charge generation layer over the underlayer; forming a charge transfer layer over the charge generation layer; and forming an outmost protective layer over the charge transfer layer; wherein the outmost protective layer comprises the product of the hydrolysis and condensation of an aromatic silicon-containing compound prepared by a process that comprises: providing an aromatic starting material; reacting said aromatic starting material with a base to form an aromatic salt; and reacting said aromatic salt with a halo-alkylene-silane to form an aromatic silicon-containing compound.

These and other features and advantages of various embodiments of materials, devices, systems and/or methods are described in or are apparent from, the following detailed description.

EMBODIMENTS

Figure 1:
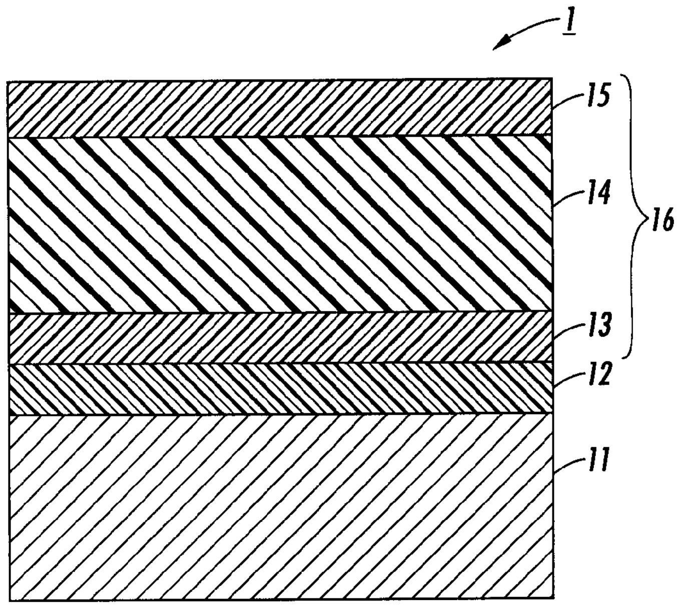
FIG. 1 is a schematic cross sectional view showing an embodiment of an electrophotographic photoreceptor of the disclosure.

This disclosure is not limited to particular embodiments described herein, and some components and processes may be varied by one of skill, based on this disclosure. The terminology used herein is for the purpose of describing particular embodiments only, and is not intended to be limiting.

In this specification and the claims that follow, singular forms such as "a," "an," and "the" include plural forms unless the content clearly dictates otherwise. In addition, reference may be made to a number of terms that shall be defined as follows:

The term "organic molecule" refers, for example, to any molecule that is made up predominantly of carbon and hydrogen, such as, for example, alkanes and arylamines. The term "heteroatom" refers, for example, to any atom other than carbon and hydrogen. Typical heteroatoms included in organic molecules include oxygen, nitrogen, sulfur and the like.

The term "saturated" refers, for example, to compounds containing only single bonds. The term "unsaturated" refers, for example, to compounds that contain one or more double bonds and/or one or more triple bonds.

The terms "hydrocarbon" and "alkane" refer, for example, to branched and unbranched molecules having the general formula $CnH_{2n+2}$, in which n is a number of 1 or more, such as of from about 1 to about 60. Exemplary alkanes include methane, ethane, n-propane, isopropane, n-butane, isobutane, tert-butane, octane, decane, tetradecane, hexadecane, eicosane, tetracosane and the like. Alkanes may be substituted by replacing hydrogen atoms with one or more functional groups. The term "aliphatic" refers, for example, to straight-chain molecules, and may be used to describe acyclic, unbranched alkanes. The term "long-chain" refers, for example, to hydrocarbon chains in which n is a number of from about 8 to about 60, such as from about 20 to about 45 or from about 30 to about 40. The term "short-chain" refers, for example, to hydrocarbon chains in which n is a number of from about 1 to about 7, such as from about 2 to about 5 or from about 3 to about 4.

The term "alkyl" refers, for example, to a branched or unbranched saturated hydrocarbon group, derived from an alkane and having the general formula $C_nH_{2n+1}$, in which n is a number of 1 or more, such as of from about 1 to about 60. Exemplary alkyl groups include methyl, ethyl, n-propyl, isopropyl, n-butyl, isobutyl, tert-butyl, octyl, decyl, tetradecyl, hexadecyl, eicosyl, tetracosyl and the like. The term "lower alkyl" refers, for example, to an alkyl group of from about 1 to about 12 carbon atoms.

The term "alkylene" refers, for example, to a branched or unbranched saturated hydrocarbon group of about 1 to about 12 carbon atoms and having two bonds to other portions of the molecule. Exemplary alkylene groups have the structure $—(CH_2)_a—$, in which a is an integer in a range of from about 1 to about 12.

The term "alkene" refers, for example, to branched and unbranched unsaturated molecules that are derived from alkenes and include one or more double bonds between carbon atoms. Exemplary alkanes include ethene, propene, butene, butadiene, octene, decene, tetradecene, hexadecene, eicosene, tetracosene and the like. Alkenes may be substituted by replacing hydrogen atoms with one or more functional groups.

The term "alkenyl" refers, for example, to a branched or unbranched unsaturated hydrocarbon group containing one or more double bond and derived from an alkene. Exemplary alkenyl groups include ethenyl, propenyl, butenyl, octenyl, decenyl, tetradecenyl, hexadecenyl, eicosenyl, tetracosenyl and the like. The term "lower alkenyl" refers, for example, to an alkenyl group of from about 1 to about 12 carbon atoms.

The term "alkyne" refers, for example, to branched and unbranched unsaturated molecules that are derived from alkanes and include one or more triple bonds between carbon atoms. Exemplary alkynes include ethyne, propyne, butyne, octyne, decyne, tetradecyne, hexadecyne, eicosyne, tetracosyne and the like. Alkynes may be substituted by replacing hydrogen atoms with one or more functional groups.

The term "alkynyl" refers, for example, to a branched or unbranched unsaturated hydrocarbon group containing one or more triple bond and derived from an alkyne. Exemplary alkynyl groups include ethynyl, propynyl, butynyl, octynyl, decynyl, tetradecynyl, hexadecynyl, eicosynyl, tetracosynyl and the like. The term "lower alkynyl" refers, for example, to an alkynyl group of from about 1 to about 12 carbon atoms.

The term "aromatic" refers, for example, to an organic molecule or radical in which some of the bonding electrons are delocalized or shared among several atoms within the molecule and not localized in the vicinity of the atoms involved in the bonding. Aromatic compounds may include heteroatoms in the molecules, and may include one or more cyclic or ring systems that may include one or more fused aromatic rings. Examples of aromatic compounds include, for example, benzene ($C_6H_6$), naphthalene ($C_{10}H_8$), anthracene ($C_{14}H_{10}$), pyridine ($C_5H_5N$) and the like. Optionally, these aromatic compounds may be substituted with one or more independently selected substituents, including alkyl, alkenyl, alkoxy, aryl, hydroxyl and nitro groups.

The term "aryl" refers, for example, to an organic group derived from an aromatic compound and having the same general structure as the aromatic compound. Examples of aromatic compounds include, for example, phenyl ($C_6H_5$), benzyl ($C_7H_7$), naphthyl ($C_{10}H_7$), anthracyl ($C_{14}H_9$), pyridinyl ($C_5H_4N$) and the like. Optionally, these aromatic groups may be substituted with one or more independently selected substituents, including alkyl, alkenyl, alkoxy, aryl, hydroxyl and nitro groups.

The term "arylamine" refers, for example, to moieties containing both aryl and amine groups. Exemplary aralkylene groups have the structure Ar—NRR', in which Ar represents an aryl group and R and R' are groups that may be independently selected from hydrogen and substituted and unsubstituted alkyl, alkenyl, aryl and other suitable functional groups. The term "triarylamine" refers, for example, to arylamine compounds having the general structure NArAr'Ar", in which Ar, Ar' and Ar" represent independently selected aryl groups.

The term "alkoxy" refers, for example, to an alkyl group bound through a single, terminal ether linkage; that is, an "alkoxy" group is defined as —OR in which R is an alkyl as defined above. A "lower alkoxy" refers, for example, to an alkoxy group containing 1 to about 6 carbon atoms.

The term "aralkylene" refers, for example, to moieties containing both alkylene and monocyclic species, typically containing less than about 12 carbon atoms in the alkylene portion, and wherein the aryl substitutent is bonded to the structure of interest through an alkylene linking group. Exemplary aralkylene groups have the structure $—(CH_2)_a—Ar$, in which Ar represents an aryl group and a is an integer in a range of from 1 to about 6.

The term "siloxane" refers, for example, to compounds containing silicon atoms bound to oxygen atoms and to organic groups. Exemplary siloxanes have the structure ROSiR'R"R"', in which O represents oxygen, Si represents silicon and R, R', R" and R"' represent independently selected organic groups, such as alkyl, alkenyl, alkynyl, alkoxy and other suitable groups.

"Alcohol" refers, for example, to an alkyl moiety in which one or more of the hydrogen atoms has been replaced by an —OH group. The term "lower alcohol" refers, for example, to an alkyl group of about 1 to about 6 carbon atoms in which at least one, and optionally all, of the hydrogen atoms has been replaced by an —OH group. The term "primary alcohol" refers, for example to alcohols in which the —OH group is bonded to a terminal or chain-ending carbon atom, such as in methanol, ethanol, 1-propanol, 1-butanol, 1-hexanol and the like. The term "secondary alcohol" refers, for example to alcohols in which the —OH group is bonded to a carbon atom that is bonded to one hydrogen atom and to two other carbon atoms, such as in 2-propanol(isopropanol), 2-butanol, 2-hexanol and the like. The term "tertiary alcohol" refers, for example to alcohols in which the —OH group is bonded to a carbon atom that is bonded to three other carbon atoms, such as in methylpropanol (tert-butanol) and the like.

The terms "halogen" or "halogen atom" refer, for example, to atoms of the elements fluorine (F), chlorine (Cl), bromine (Br), iodine (I) and astatine (At). The term "halo" refers, for example, to substitution of a halogen atom for a hydrogen atom in an organic compound. "Haloalkyl" refers, for example, to an alkyl moiety in which one or more of the hydrogen atoms has been replaced by a halogen atom. The term "lower haloalkyl" refers, for example, to an alkyl group of about 1 to about 6 carbon atoms in which at least one, and optionally all, of the hydrogen atoms has been replaced by a halogen atom. The term "perhalogenated" refers, for example, to a compound in which all of the hydrogen atoms have been replaced by halogen atoms, while the phrase "partially halogenated" refers, for example, to a compound in which less than all of the hydrogen atoms have been replaced by halogen atoms.

The term "derivative" refers, for example, to compounds that are derived from another compound and maintain the same general structure as the compound from which they are derived. For example, saturated alcohols and saturated amines are derivatives of alkanes.

The term "room temperature" refers, for example, to temperatures in a range of from about 20° C. to about 25° C.

"Optional" or "optionally" refer, for example, to instances in which subsequently described circumstance may or may not occur, and include instances in which the circumstance occurs and instances in which the circumstance does not occur.

The terms "one or more" and "at least one" refer, for example, to instances in which one of the subsequently described circumstances occurs, and to instances in which more than one of the subsequently described circumstances occurs.

In embodiments, "soluble" refers, for example, to the specified material being substantially soluble in the respective solvent, although complete (100%) solubility is not necessarily required. Likewise, in embodiments, "insoluble" refers, for example, to the specified material being substantially insoluble in the respective solvent, although complete (100%) insolubility is not necessarily required.

A method is provided for preparing aromatic silicon-containing compounds by a one-pot two-step reaction, starting with the reaction of an aromatic starting compound with a base to form a salt, followed by reacting the salt with a halo-alkylene-silane compound to provide the final product.

For example, aromatic silicon-containing compound of the formula (I), where X represents —O— can be prepared by the following reaction:

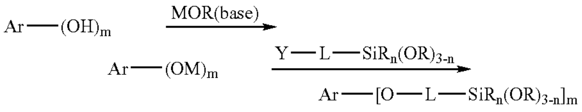

in which herein Y represents a halogen atom selected from a group consisting of I, Br, Cl and F. The aromatic silicon-containing compound formed by this method can generally be an aromatic silane compound, i.e., a compound having one or more silane groups separated by a linking group that is or contains one or more aromatic groups. For example, the aromatic silicon-containing compound can generally be represented by the following formula (I):

$$Ar—[X\text{-}L\text{-}SiR_n(OR')_{3-n}]_m \qquad (I).$$

In formula (I), X represents a divalent group or a trivalent group, L represents divalent linking group; each R independently represents one of hydrogen atom, lower alkyl groups and aryl groups; and each R' independently represents a lower alkyl group, such as an alkyl group having from 1 to 5 carbon atoms.

Suitable substituted aromatic compounds for use in embodiments include Ar—OH, such as phenols, polyphenols and the like. In some embodiments, the substituted aromatic compounds may be chosen from compounds representable by structures II-1 to II-44, which are set forth in Table 1, and the aryl groups thereof may have one or more substitutions by —OH functional groups. In particular embodiments, the substituted aromatic compound may be 4,4'-cyclohexylidenebisphenol.

TABLE 1

| | |
|---|---|
| II-1 | 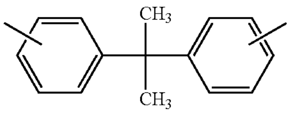 |
| II-2 | 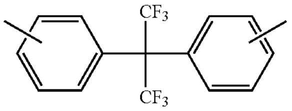 |
| II-3 | 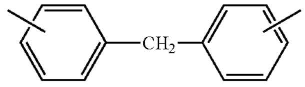 |
| II-4 | 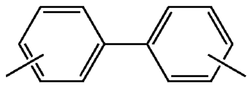 |
| II-5 | 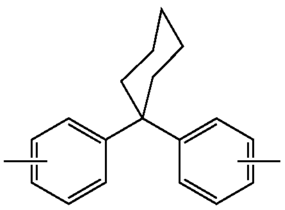 |

TABLE 1-continued
| | |
|---|---|
| II-6 | 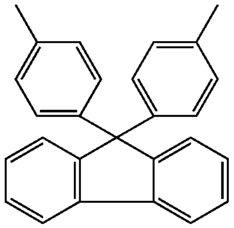 |
| II-7 | 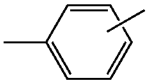 |
| II-8 | 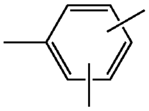 |
| II-9 | 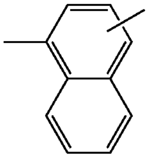 |
| II-10 | 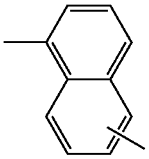 |
| II-11 | 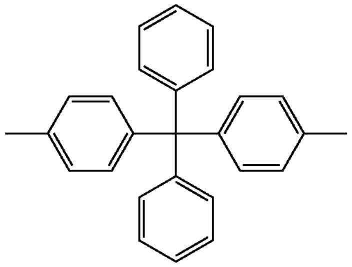 |
| II-12 | 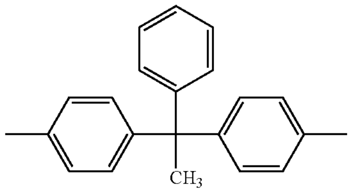 |
| II-13 | 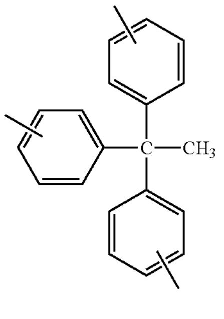 |
TABLE 1-continued
| | |
|---|---|
| II-14 | 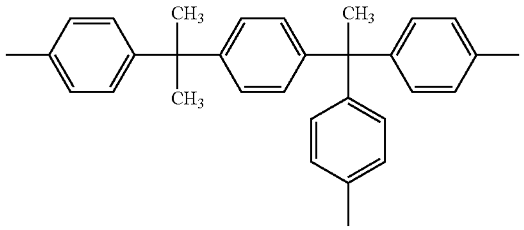 |
| II-15 | 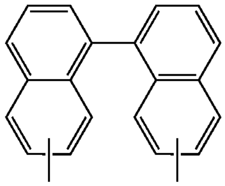 |
| II-16 | 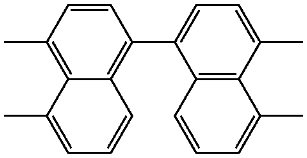 |
| II-17 | 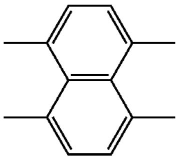 |
| II-18 | 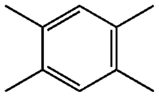 |
| II-19 | 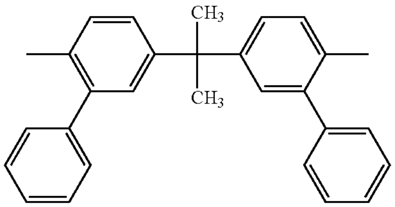 |
| II-20 | 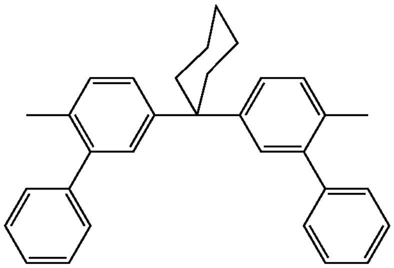 |
| II-21 | 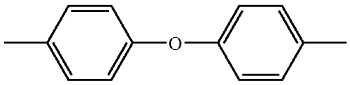 |
| II-22 | 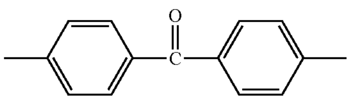 |

TABLE 1-continued
II-23
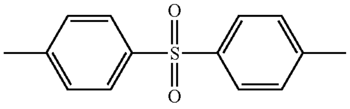
II-24
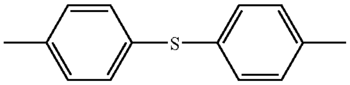
II-25
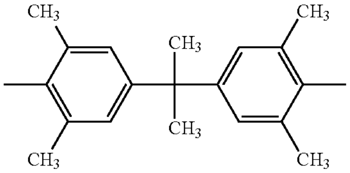
II-26
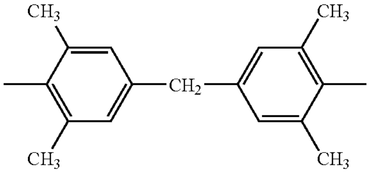
II-27
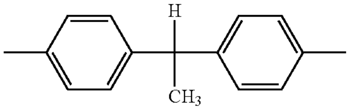
II-28
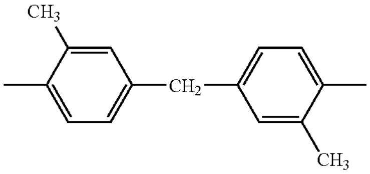
II-29
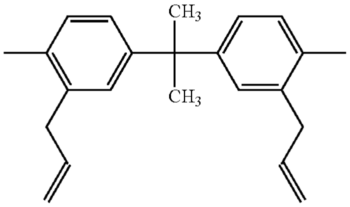
II-30
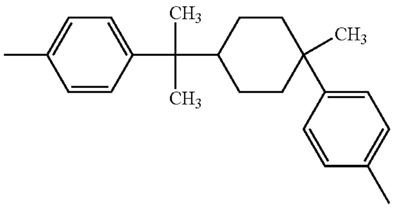
II-31
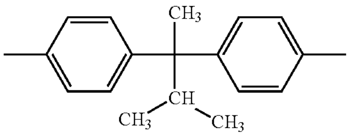
TABLE 1-continued
II-32
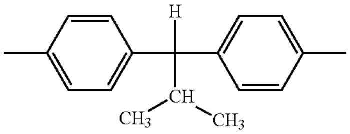
II-33
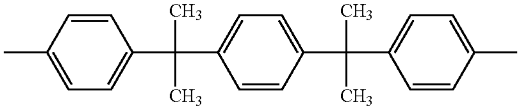
II-34
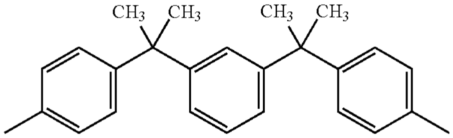
II-35
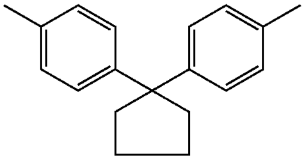
II-36
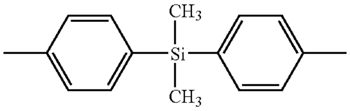
II-37
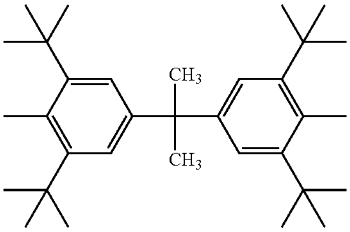
II-38
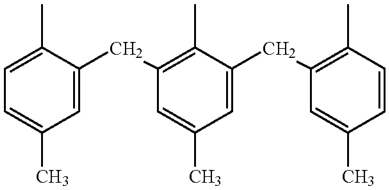
II-39
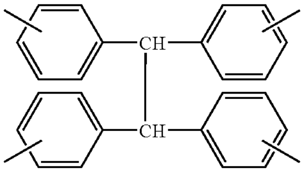
II-40
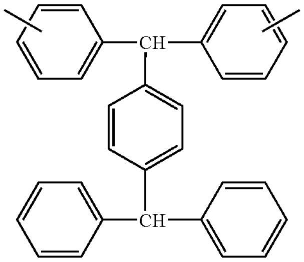

TABLE 1-continued

II-41

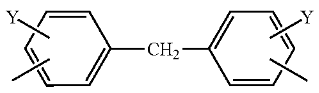

Wherein Y is F, Cl, Br, $NO_2$,

II-42

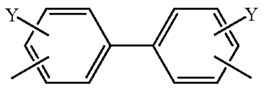

Wherein Y is F, Cl, Br, $NO_2$,

II-43

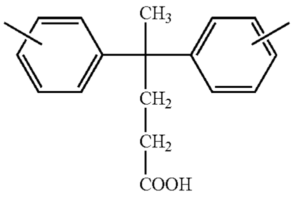

II-44

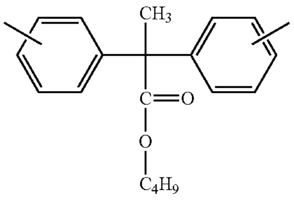

In embodiments, the substituted aromatic compound may be reacted in amounts from about 3 to about 40% by weight, or from about 5 to about 25% by weight, based on the total weight of the reactants.

In the method of embodiments, the substituted aromatic compound is reacted with a base to form a salt. Any suitable base may be used in embodiments, such as alkaline hydroxide bases and alkaline alkoxide bases. Exemplary bases that may be used in embodiments of the method include bases having the general formula MOR, in which O is oxygen, M is a metal atom, and R is a hydrogen atom or an alkyl group. In embodiments, M is a metal selected from potassium, sodium, lithium, calcium, magnesium and the like; and R is a hydrogen atom or an alkyl group selected from methyl, ethyl, n-propyl, isopropyl, n-butyl, isobutyl, tert-butyl, octyl, decyl and the like. In embodiments, for example, the base may be a potassium tert-butoxide.

In embodiments, the base may be reacted in amounts from about 1 to about 50% by weight, or from about 5 to about 25% by weight, based on the total weight of the reactants.

The formation of salts in the method of embodiments may be carried out in any suitable solvent or mixture of solvents. Suitable solvents include, for example, alcohols, such as methanol, ethanol, isopropanol, butanol and the like, and mixtures thereof. The choice of specific solvent or mixture of solvents can be decided based on the solubility of the starting materials and products, and will be readily apparent or within routine experimentation to those skilled in the art. Solvents may be chosen based on the desired operating temperature range. The first solvent also may be a mixture of an alcohol and a polar aprotic solvents, such as dimethylformamide, dimethyl sulfoxide, acetone, ethyl acetate, tetrahydrofuran, methyl ethyl ketone and the like. In embodiments, for example, the first solvent may be a mixture of isopropanol and dimethylformamide.

In embodiments, the solvent may be included in amounts from about 40 to about 97% by weight, or from about 75 to about 95% by weight, based on the total weight of the reactants.

Salt formation in the method of embodiments may be carried out at temperatures of from about 0° C. to about 100° C., such as from about 25° C. to about 85° C. or from about 50° C. to about 75° C. In some embodiments, salt formation may be conducted at a temperature of 70° C.

After the salt of the substituted aromatic compound is formed, the salt may be optionally isolated and/or purified. However, isolation and purification of the salt are not necessary to achieving high yields of final products with the method of embodiments. In fact, a benefit of embodiments is that the next step can be conducted in the same reactor vessel, or pot, as the first step, without isolation or purification of the products of the first step. Thus, the disclosure provides a one-pot, two-step process. Of course, if desired, the products of the first step can be suitably isolated or purified prior to conducting the second step of the process, and that second step can be conducted in the same or different reactor vessel.

After salt formation, the alcoholic solvent may be replaced, in whole or in part, by a polar aprotic solvent, such as those set forth above. Then, one or more halo-alkylene-silane compounds are added to the reaction mixture. In embodiments, the halo-alkylene-silane compound has the general formula (III):

$$Y\text{-}L\text{-}SiR_n(OR')_{3-n} \qquad (III),$$

in which Y is a halogen atom; L represents a divalent linking group; each R is independently chosen from hydrogen atom, lower alkyl groups (such as alkyl groups having 1 to 12 carbon atoms) and aryl groups; and R' is independently chosen from lower alkyl groups, such as alkyl groups having from 1 to 5 carbon atoms. Suitable examples of L include, but are not limited to: a divalent hydrocarbon group represented by $—C_mH_{2m}—$, $—C_mH_{2m2}—$, $—C_mH_{2m4}$ (m is an integer of 1 to about 15, such as from 2 to about 10), $—CH_2—C_6H_4—$ or $—C_6H_4—C_6H_4—$, or a divalent group in which two or more of them are combined. The divalent group may also optionally have a substituent group such as an alkyl group, a phenyl group, an alkoxyl group or an amino group on its side chain. In formula (III), n is an integer, which can be 0, 1 or 2, and m is an integer, which can be from 1 to 10, such as from 1 to 5. Such compounds may be used individually or in combinations of one or more such halo-alkylene-silane compounds. In embodiments, exemplary halo-alkyene-silane compounds include, for example, fluoropropylmethyldiisopropoxysilane, chloropropylmethyldiisopropoxysilane, bromopropylmethyldiisopropoxysilane and iodopropylmethyldiisopropoxysilane, and mixtures thereof.

The silylalkylation reaction of embodiments may be carried out in any suitable solvent or mixture of solvents. Suitable solvents include, for example, the polar aprotic solvents discussed above and the alcohol solvents discussed above for use in the formation of the salt of the substituted aromatic compounds, as well as mixtures of such solvents with additional solvents including alcohols, such as methanol, ethanol, isopropanol, butanol and the like; polar aprotic solvents, such as dimethylformamide, dimethyl sulfoxide, acetone, ethyl acetate, tetrahydrofuran, methyl ethyl ketone and the like; and mixtures thereof. The choice of specific solvent or mixture of solvents can be decided based on the solubility of the starting materials, intermediates and final products, and will be readily apparent or within routine experimentation to those skilled in the art. Solvents may be chosen based on the desired operating temperature range.

Reaction of the salt of the substituted aromatic compound with the halo-alkylene-silane compound in the method of embodiments may be carried out at temperatures of from about 25° C. to about 120° C., such as from about 50° C. to about 120° C. or from about 80° C. to about 110° C. In embodiments, the reaction of the salt of the substituted aromatic compound with the halo-alkylene-silane compound may be carried out at a temperature of 100° C. In embodiments, the reaction of the salt of the substituted aromatic compound with the halo-alkylene-silane may be conducted at a temperature that is about 5° C. to about 30° C. greater than the temperature at which the salt is formed. The reaction may be carried out for about 1 min to about 5 hours, such as from about 30 min to about 2 hours. A salt, such as potassium iodide or the like, may be optionally added during, or in some embodiments after the completion of, the silylalkylation reaction.

After the reaction, the product may be isolated by any suitable method or combination of methods, such as solvent extraction. The final product may be purified by any process known in the art, such as distillation, recrystallization, and flash column chromatography. The desired structures of products can be confirmed with $^1$H NMR spectroscopy, as well as high pressure liquid chromatography and gas permeation chromatography and other methods known to those of skill in the art.

The aromatic silicon-containing compounds produced by this process can be used as final products, for example as aromatic binder materials in electrostatographic imaging members. For example, the aromatic silicon-containing compound of formula (I) may be produced by the method of embodiments, hydrolyzed and condensed to form a cross-linked siloxane-containing component, which can be incorporated into a silicon hard overcoat layer of a electrophotographic photoreceptor. The product of hydrolysis and condensation of the aromatic silicon-containing compound can be present in an amount of about 5% to about 80% of the total weight of cross-linked siloxane-containing outmost protective layer. The product of hydrolysis and condensation of the aromatic silicon-containing compound, such as the aromatic silicon-containing compound of formula (I), is present in an amount of about 20% to about 60% of the total weight of the silicon hard overcoat layer. An exemplary electrostatographic imaging member will now be described in greater detail.

In electrophotographic photoreceptors of embodiments, the photoreceptors can include various layers such as undercoating layers, charge-generating layers, charge-transport layers, overcoat layers, and the like. The overcoating layers of embodiments can be a silicon-overcoat layer, which can comprise one or more silicon compounds, a resin, and a charge-transport molecule such as an arylamine.

In embodiments, the resin may be a resin soluble in a liquid component in a coating solution used for formation of a silicon-overcoat layer. Such a resin soluble in the liquid component may be selected based upon the kind of liquid component. For example, if the coating solution contains an alcoholic solvent, a polyvinyl acetal resin such as a polyvinyl butyral resin, a polyvinyl formal resin or a partially acetalized polyvinyl acetal resin in which butyral is partially modified with formal or acetoacetal, a polyamide resin, a cellulose resin such as ethyl cellulose and a phenol resin may be suitably chosen as the alcohol-soluble resins. These resins may be used either alone or as a combination of two or more resins. Of the above-mentioned resins, the polyvinyl acetal resin is particularly suitable in embodiments in terms of electric characteristics.

In embodiments, the weight-average molecular weight of the resin soluble in the liquid component may be from about 2,000 to about 1,000,000, such as from about 5,000 to about 50,000. When the weight-average molecular weight is less than about 2,000, enhancing discharge-gas resistance, mechanical strength, scratch resistance, particle dispersibility, etc., tend to become insufficient. However, when the weight-average molecular weight exceeds about 1,000,000, the resin solubility in the coating solution decreases, and the amount of resin added to the coating solution may be limited and poor film formation in the production of the photosensitive layer may result.

Further, the amount of the resin soluble in the liquid component may be, in embodiments, from about 0.1 to about 15% by weight, or from about 0.5 to about 10% by weight, based on the total amount of the coating solution. When the amount added is less than 0.1% by weight, enhancing discharge-gas resistance, mechanical strength, scratch resistance, particle dispersibility, etc. tend to become insufficient. However, if the amount of the resin soluble in the liquid component exceeds about 15% by weight, there is a tendency for formation of indistinct images when the electrophotographic photoreceptor of the disclosure is used at high temperature and high humidity.

There is no particular limitation on the silicon compound used in embodiments of the disclosure, as long as it has at least one silicon atom. However, a compound having two or more silicon atoms in its molecule may be used in embodiments. The use of the compound having two or more silicon atoms in its molecule allows both the strength and image quality of the electrophotographic photoreceptor to be achieved at higher levels.

Further, in embodiments, the silicon compounds may include silane coupling agents such as a tetrafunctional alkoxysilane, such as tetramethoxysilane, tetraethoxysilane and the like; a trifunctional alkoxysilane such as methyltrimethoxy-silane, methyltriethoxysilane, ethyltrimethoxysilane, methyltrimethoxyethoxysilane, vinyltrimethoxysilane, vinyltriethoxysilane, phenyltrimethoxysilane, γ-glycidoxypropylmethyldiethoxysilane, γ-glycidoxypropyltrimethoxysilane, γ-glycidoxypropyl-triethoxysilane, γ-aminopropyltriethoxysilane, γ-aminopropyltrimethoxysilane, γ-aminopropylmethyldimethoxysilane, N-β-(aminoethyl)-γ-aminopropyltriethoxy-silane, (tridecafluoro-1,1,2,2-tetrahydrooctyl)triethoxysilane, (3,3,3-trifluoropropyl)-trimethoxysilane, 3-(heptafluoroisopropoxy)propyltriethoxysilane, 1H,1H,2H,2H-perfluoroalkyltriethoxysilane, 1H,1H,2H,2H-perfluorodecyltriethoxysilane or 1H,1H,2H,2H-perfluorooctyltriethoxysilane; a bifunctional alkoxysilane such as dimethyldimethoxysilane, diphenyldimethoxysilane or methylphenyldimethoxysilane; and a monofunctional alkoxysilane such as trimethylmethoxysilane. In order to improve the strength of the photosensitive layer, trifunctional alkoxysilanes and tetrafunctional alkoxysilanes may be used in embodiments, and in order to improve the flexibility and film-forming properties, monofunctional alkoxysilanes and bifunctional alkoxysilanes may be used in embodiments.

Silicone hard-coating agents containing these coupling agents can also be used in embodiments. Commercially available hard-coating agents include KP-85, X-40-9740 and X-40-2239 (available from Shinetsu Silicone Co., Ltd.), and AY42-440, AY42-441 and AY49-208 (available from Toray Dow Corning Co., Ltd.).

Various fine particles can also be added to the silicon compound-containing layer, for example, to further improve the stain adhesion resistance and lubricity of embodiments of the electrophotographic photoreceptor. The fine particles may be used either alone or as a combination of two or more such fine particles. Non-limiting examples of the fine particles include fine particles containing silicon, such as fine particles containing silicon as a constituent element, and specifically include colloidal silica and fine silicone particles. The content of the fine silicone particles in the silicon-containing layer of embodiments may be within the range of 0.1 to 20% by weight, or within the range of 0.5 to 10% by weight, based on the total solid content of the silicon-containing layer.

Colloidal silica used in embodiments as the fine particles containing silicon in the disclosure is selected from an acidic or alkaline aqueous dispersion of the fine particles having an average particle size of 1 to 100 nm, or 10 to 30 nm, and a dispersion of the fine particles in an organic solvent, such as an alcohol, a ketone or an ester, and generally, commercially available particles can be used.

There is no particular limitation on the solid content of colloidal silica in a top-surface layer of the electrophotographic photoreceptor of embodiments. However, in embodiments, colloidal silica may be included in amounts of from about 1 to about 50% by weight, such as from about 5 to about 30% by weight, based on the total solid content of the top surface layer, in terms of film forming properties, electric characteristics and strength.

The fine silicone particles used as the fine particles containing silicon in the disclosure may be selected from silicone resin particles, silicone rubber particles and silica particles surface-treated with silicone, which are spherical and have an average particle size of from about 1 to 500 nm, such as from about 10 to about 100 nm, and generally, commercially available particles can be used in embodiments.

In embodiments, the fine silicone particles are small-sized particles that are chemically inactive and excellent in dispersibility in a resin, and further are low in content as may be necessary for obtaining sufficient characteristics. Accordingly, the surface properties of the electrophotographic photoreceptor can be improved without inhibition of the cross-linking reaction. That is to say, fine silicone particles improve the lubricity and water repellency electrophotographic photoreceptor surfaces where incorporated into strong cross-linked structures, which may then be able to maintain good wear resistance and stain-adhesion resistance for a long period of time. The content of the fine silicone particles in the silicon compound-containing layer of embodiments may be from about 0.1 to about 20% by weight, such as from about 0.5 to about 10% by weight, based on the total solid content of the silicon compound-containing layer.

Other fine particles that may be used in embodiments include fine fluorine-based particles such as ethylene tetrafluoride, ethylene trifluoride, propylene hexafluoride, vinyl fluoride and vinylidene fluoride, and semiconductive metal oxides such as $ZnO—Al_2O_3$, $SnO_2—Sb_2O_3$, $In_2O_3—SnO_2$, $ZnO—TiO_2$, $MgO—Al_2O_3$, $FeO—TiO_2$, $TiO_2$, $SnO_2$, $In_2O_3$, ZnO and MgO.

In conventional electrophotographic photoreceptors, when the above-mentioned fine particles are contained in the photosensitive layer, the compatibility of the fine particles with a charge-transport substance or a binding resin may become insufficient, which causes layer separation in the photosensitive layer, and thus the formation of an opaque film. As a result, the electric characteristics have deteriorated in some cases. In contrast, the silicon compound-containing layer of embodiments (a charge-transport layer in this case) may contain the resin soluble in the liquid component in the coating solution used for formation of this layer and the silicon compound, thereby improving the dispersibility of the fine particles in the silicon compound-containing layer. Accordingly, the pot life of the coating solution may be sufficiently prolonged, and deterioration of the electric characteristics may be prevented.

Further, an additive such as a plasticizer, a surface modifier, an antioxidant, or an agent for preventing deterioration by light can also be used in the silicon compound-containing layer of embodiments. Non-limiting examples of plasticizers that may be used in embodiments include, for example, biphenyl, biphenyl chloride, terphenyl, dibutyl phthalate, diethylene glycol phthalate, dioctyl phthalate, triphenylphosphoric acid, methylnaphthalene, benzophenone, chlorinated paraffin, polypropylene, polystyrene and various fluorohydrocarbons.

The antioxidants may include an antioxidant having a hindered-phenol, hindered-amine, thioether or phosphite partial structure. This is effective for improvement of potential stability and image quality in environmental variation. The antioxidants include an antioxidant having a hindered-phenol, hindered-amine, thioether or phosphite partial structure. This is effective for improvement of potential stability and image quality in environmental variation. For example, the hindered-phenol antioxidants include SUMILIZER BHT-R, SUMILIZER MDP-S, SUMILIZER BBM-S, SUMILIZER WX-R, SUMILIZER NW, SUMILIZER BP-76, SUMILIZER BP-101, SUMILIZER GA-80, SUMILIZER GM and SUMILIZER GS (the above are manufactured by Sumitomo Chemical Co., Ltd.), IRGANOX 1010, IRGANOX 1035, IRGANOX 1076, IRGANOX 1098, IRGANOX 1135, IRGANOX 1141, IRGANOX 1222, IRGANOX 1330, IRGANOX 1425WLj, IRGANOX 1520Lj, IRGANOX 245, IRGANOX 259, IRGANOX 3114, IRGANOX 3790, IRGANOX 5057 and IRGANOX 565 (the above are manufactured by Ciba Specialty Chemicals), and ADECASTAB AO-20, ADECASTAB AO-30, ADECASTAB AO-40, ADECASTAB AO-50, ADECASTAB AO-60, ADECASTAB AO-70, ADECASTAB AO-80 and ADECASTAB AO-330i (the above are manufactured by Asahi Denka Co., Ltd.). The hindered-amine antioxidants include SANOL LS2626, SANOL LS765, SANOL LS770, SANOL LS744, TINUVIN 144, TINUVIN 622LD, MARK LA57, MARK LA67, MARK LA62, MARK LA68, MARK LA63 and SUMILIZER TPS, and the phosphite antioxidants include MARK 2112, MARK PEP•8, MARK PEP•24G, MARK PEP•36, MARK 329K and MARK HP•10. Of these, hindered-phenol and hindered-amine antioxidants may be particularly suitable, in embodiments.

There is no particular limitation on the thickness of the silicon-containing layer, however, in embodiments, the silicon-containing layer may be from about 2 to about 5 μm in thickness, such as from about 2.7 to about 3.2 μm in thickness.

The electrophotographic photoreceptor of embodiments may be either a function-separation-type photoreceptor, in which a layer containing a charge-generation substance (charge-generation layer) and a layer containing a charge-transport substance (charge-transport layer) are separately provided, or a monolayer-type photoreceptor, in which both the charge-generation layer and the charge-transport layer are contained in the same layer, as long as the electrophotographic photoreceptor of the particular embodiment has the photosensitive layer provided with the above-mentioned silicon compound-containing layer. The electrophotographic photoreceptor will be described in greater detail below, taking the function-separation-type photoreceptor as an example.

FIG. 1 is a cross-sectional view schematically showing an embodiment of the electrophotographic photoreceptor of the disclosure. The electrophotographic photoreceptor 1 shown in FIG. 1 is a function-separation-type photoreceptor in which a charge-generation layer 13 and a charge-transport layer 14 are separately provided. That is, an underlayer 12, the charge-generation layer 13, the charge transport layer 14 and a protective layer 15 are laminated onto a conductive support 11 to form a photosensitive layer 16. The protective layer 15 contains a resin soluble in the liquid component contained in the coating solution used for formation of this layer and the silicon compound. The various layers of the photoreceptor shown in FIG. 1 are generally known, and are described in detail in the above-mentioned commonly owned and co-pending applications.

The electrophotographic photoreceptor of embodiments should not be construed as being limited to the above-mentioned constitution. For example, the electrophotographic photoreceptor shown in FIG. 1 is provided with the protective layer 15. However, when the charge-transport layer 14 contains the resin soluble in the liquid component in the coating solution used for formation of this layer and the silicon compound, the charge-transport layer 14 may be used as a top surface layer (a layer on the side farthest apart from the support 11) without using the protective layer 15. In this case, the charge-transport substance contained in the charge-transport layer 14 is desirably soluble in the liquid component in the coating solution used for formation of the charge-transport layer 14. For example, when the coating solution used for formation of the charge-transport layer 14 contains an alcohol solvent, the silicon compounds described above, including arylamine derivatives prepared by processes that include selective hydrogenation by catalytic transfer, can be used as the charge-transport substances. In embodiments, a particularly suitable charge-transport molecule is the following arylamine (Compound III):

centered on the support 9. A charging device 2, an exposure device 3, a developing device 4, a transfer device 5 and a cleaning unit 7 are arranged in this order along the rotational direction of the electrophotographic photoreceptor 1. Further, this exemplary apparatus is equipped with an image fixing device 6, and a medium P to which a toner image is to be transferred is conveyed to the image fixing device 6 through the transfer device 5.

Figure 3:
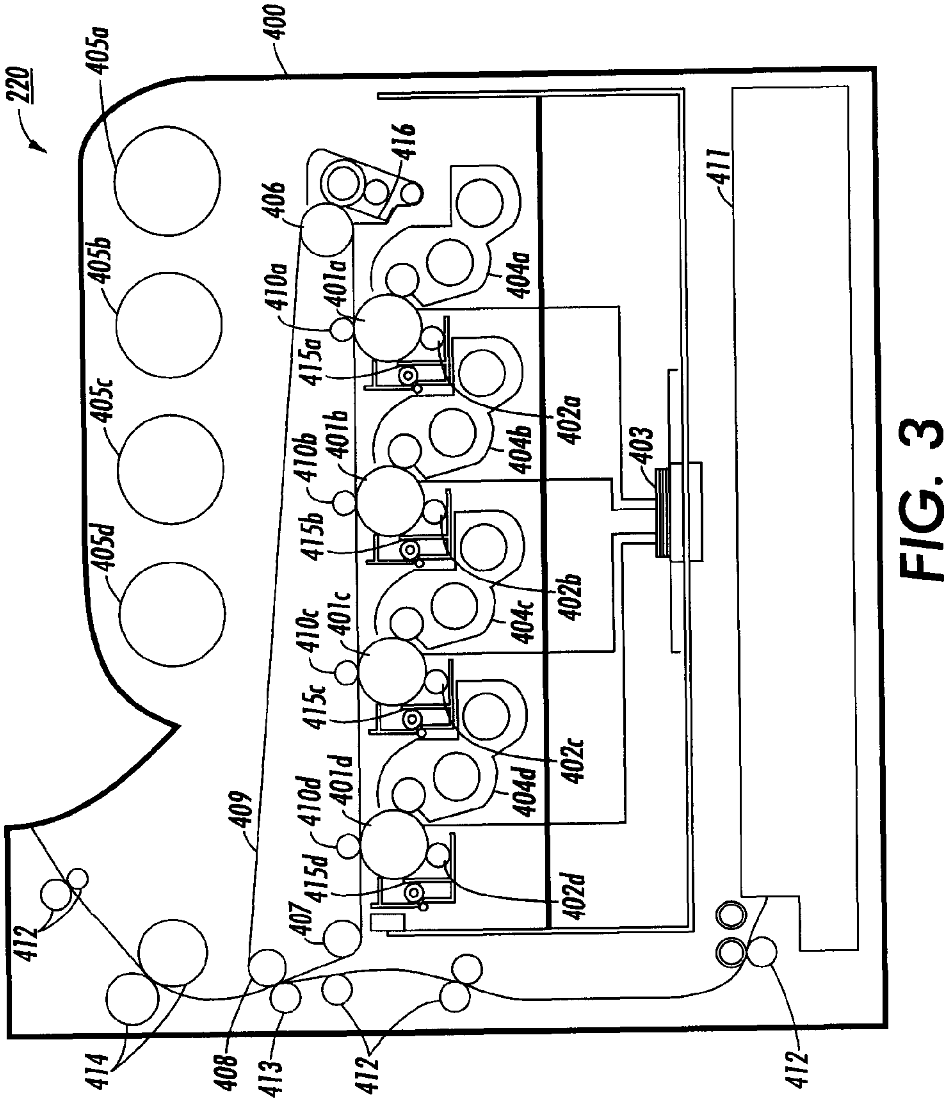
FIG. 3 is a schematic view showing another embodiment of an image forming apparatus of the disclosure.
Figure 4:
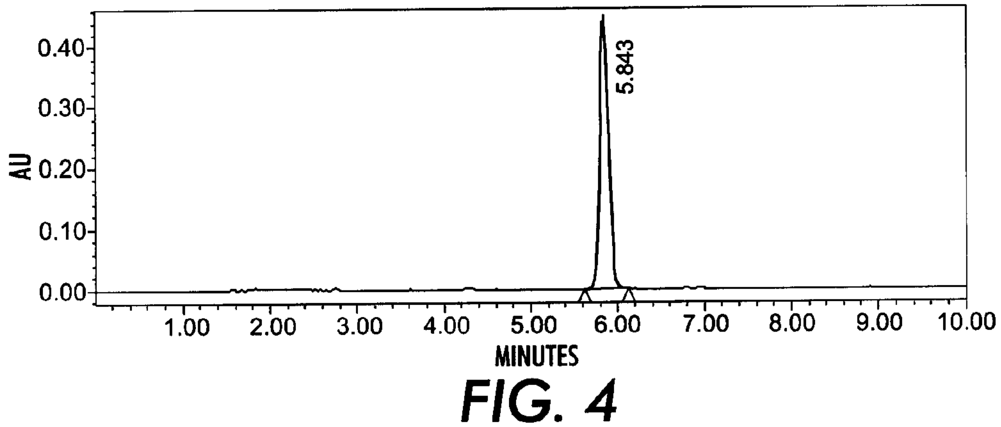
FIG. 4 is a high pressure liquid chromatograph of an exemplary product produced according to exemplary methods.
Figure 5:
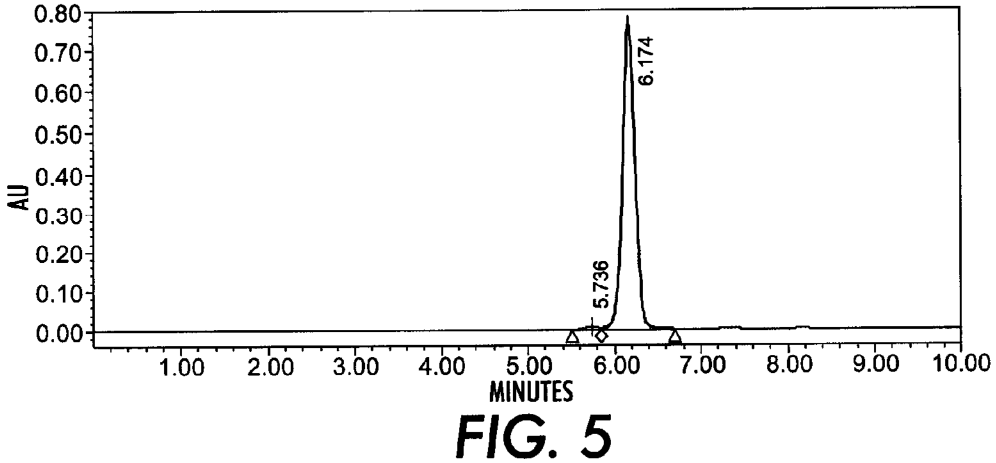
FIG. 5 is a gas phase chromatograph of an exemplary product produced according to exemplary methods.
Figure 6:
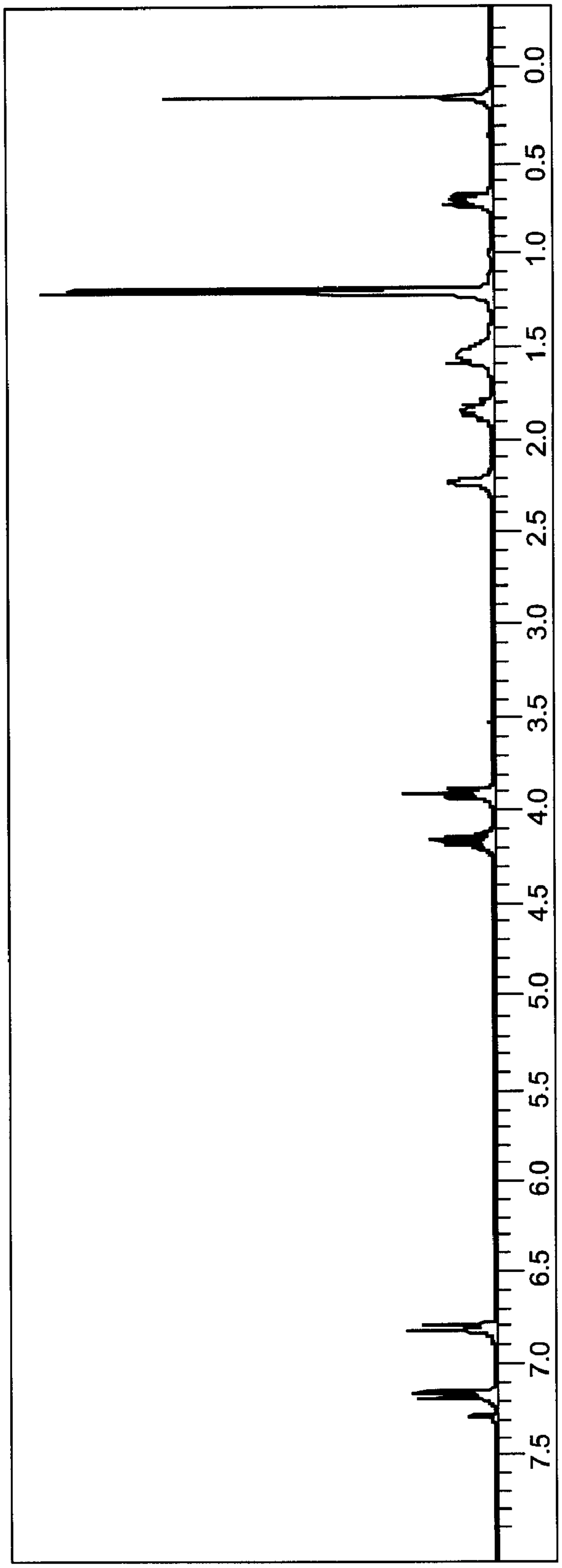
FIG. 6 is a proton nuclear magnetic ($^1H$ NMR) spectrograph of an exemplary product produced according to exemplary methods.

FIG. 3 is a cross-sectional view showing another exemplary embodiment of an image-forming apparatus. The image-forming apparatus 220 shown in FIG. 3 is an image-forming apparatus of an intermediate-transfer system, and four electrophotographic photoreceptors 401*a* to 401*d* are arranged in parallel with each other along an intermediate-transfer belt 409 in a housing 400.

Here, the electrophotographic photoreceptors 401*a* to 401*d* carried by the image-forming apparatus 220 are each the electrophotographic photoreceptors. Each of the electrophotographic photoreceptors 401*a* to 401*d* may rotate in a predetermined direction (counterclockwise on the sheet of FIG. 3), and charging rolls 402*a* to 402*d*, developing device 404*a* to 404*d*, primary transfer rolls 410*a* to 410d and cleaning blades 415*a* to 415*d* are each arranged along the rotational direction thereof. In each of the developing device 404*a* to 404*d*, four-color toners of yellow (Y), magenta (M), cyan (C) and black (B) contained in toner cartridges 405*a* to 405*d* can be supplied, and the primary transfer rolls 410*a* to 410*d* are each brought into abutting contact with the electrophotographic photoreceptors 401*a* to 401*d* through an intermediate-transfer belt 409.

Further, a laser-light source (exposure unit) 403 is arranged at a specified position in the housing 400, and it is possible to irradiate surfaces of the electrophotographic photoreceptors 401*a* to 401*d* after charging with laser light emitted from the laser-light source 403. This performs the respective steps of (III)

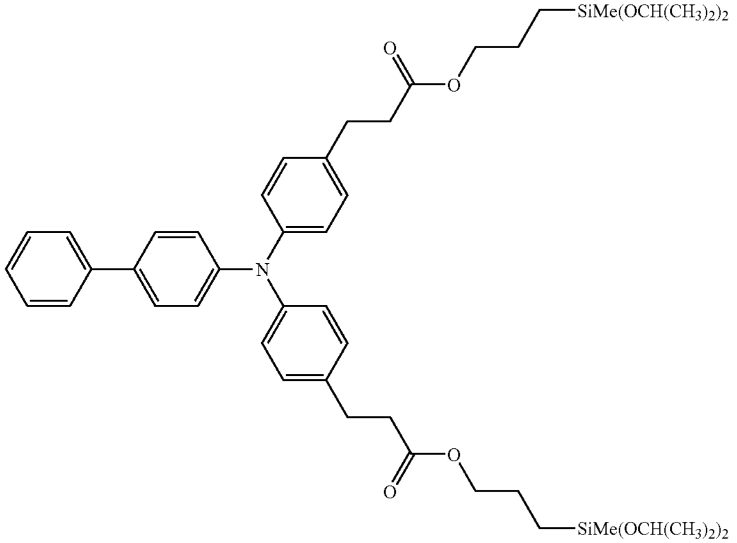

Figure 2:
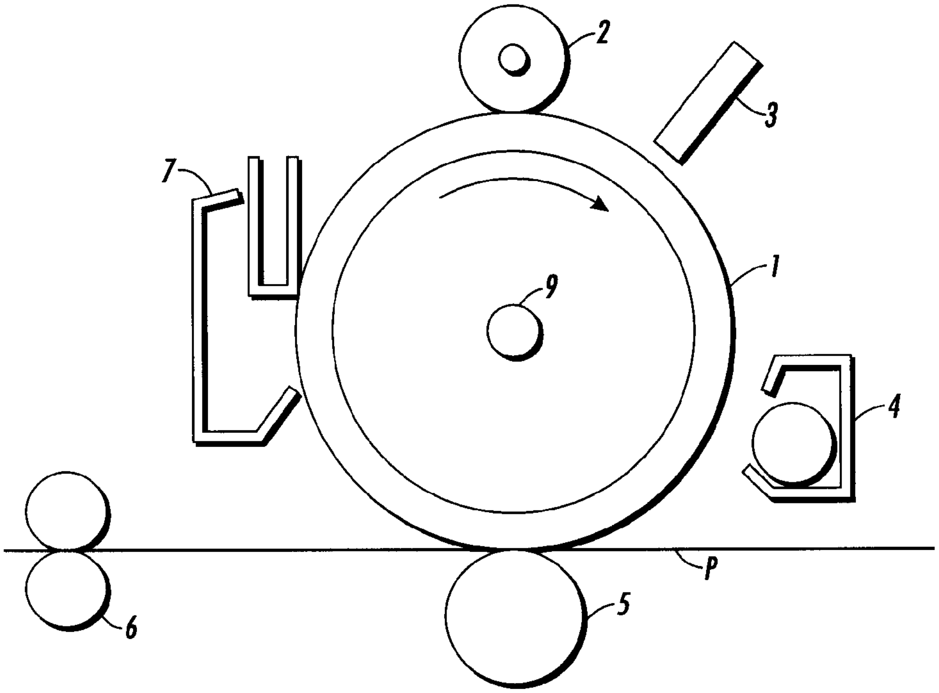
FIG. 2 is a schematic view showing an embodiment of an image forming apparatus of the disclosure.

FIG. 2 is a schematic view showing an embodiment of an image forming apparatus or xerographic machine. In the apparatus shown in FIG. 2, an electrophotographic photoreceptor 1 is supported by a support 9, and rotatable at a specified rotational speed in the direction indicated by the arrow, charging, exposure, development, primary transfer and cleaning in turn in the rotation step of the electrophotographic photoreceptors 401*a* to 401*d*, and toner images of the respective colors are transferred onto the intermediate-transfer belt 409, one over the other.

The intermediate-transfer belt 409 is supported with a driving roll 406, a backup roll 408 and a tension roll 407 at a specified tension, and rotatable by the rotation of these rolls without the occurrence of deflection. Further, a secondary transfer roll 413 is arranged so that it is brought into abutting contact with the backup roll 408 through the intermediate-transfer belt 409. The intermediate-transfer belt 409, which has passed between the backup roll 408 and the secondary transfer roll 413, is cleaned up by a cleaning blade 416, and then repeatedly subjected to the subsequent image-formation process.

Further, a tray (tray for a medium to which a toner image is to be transferred) 411 is provided at a specified position in the housing 400. The medium to which the toner image is to be transferred (such as paper) in the tray 411 is conveyed in turn between the intermediate-transfer belt 409 and the secondary transfer roll 413, and further between two fixing rolls 414 brought into abutting contact with each other, with a conveying roll 412, and then delivered out of the housing 400.

According to the exemplary image-forming apparatus 220 shown in FIG. 3, the use of electrophotographic photoreceptors of embodiments as electrophotographic photoreceptors 401*a* to 401*d* may achieve discharge gas resistance, mechanical strength, scratch resistance, etc. on a sufficiently high level in the image-formation process of each of the electrophotographic photoreceptors 401*a* to 401*d*. Accordingly, even when the photoreceptors are used together with the contact-charging devices or the cleaning blades, or further with the spherical toner obtained by chemical polymerization, good image quality can be obtained without the occurrence of image defects such as fogging. Therefore, also according to the image-forming apparatus for color-image formation using the intermediate-transfer body, such as this embodiment, the image-forming apparatus, which can stably provide good image quality for a long period of time, is realized.

The disclosure should not be construed as being limited to the above-mentioned embodiments. For example, each apparatus shown in FIG. 2 or 3 may be equipped with a process cartridge comprising the electrophotographic photoreceptor 1 (or the electrophotographic photoreceptors 401*a* to 401*d*) and charging device 2 (or the charging devices 402*a* to 402*d*). The use of such a process cartridge allows maintenance to be performed more simply and easily.

Further, in embodiments, when a charging device of the non-contact charging system such as a corotron charger is used in place of the contact-charging device 2 (or the contact-charging devices 402*a* to 402*d*), sufficiently good image quality can be obtained.

Specific examples are described in detail below. These examples are intended to be illustrative, and the materials, conditions, and process parameters set forth in these exemplary embodiments are not limiting. All parts and percentages are by weight unless otherwise indicated.

EXAMPLES

Example 1-5

Preparation of Aromatic Silicon-Containing Compounds

An aromatic silicon-containing compound is prepared having the structure of formula (I), where X is —O—, L is —$C_3H_6$—, the $(RO)_{3-n}R_nSi$— groups are $(^iPrO)_2MeSi$—, and Ar is one of formulas (II-1) to (II-44). In the following Examples, the aromatic silicon-containing compound is prepared having the structure of formula as defined herein are referred to as compounds (I-#), where # refers to the respective compounds II. Thus, compound (I-1) is a compound of formula I as defined herein, where Ar is formula (II-1).

Example 1

Synthesis of the Aromatic Silicon-Containing Compound (I-1)

A 5-L three-necked flas was fitted with an argon inlet, mechanical stirrer and a thermometer, and was charged with isopropanol (1.6 L), dimethylformamide (600 mL) and potassium tert-butoxide (295 g). The reaction mixture was stirred at 50° C. for 10 minutes. Bisphenol A (300 g) was added to the reaction mixture; the temperature was raised to 70° C.; and the reaction mixture was stirred for 30 minutes, until the bisphenol A was dissolved. The reaction mixture was then heated to 100° C. to rapidly distill off the isopropanol (boiling point 82° C.). Approximately 1 L of isopropanol was removed by this distillation.

An additional amount of dimethylformamide (1.4 L) was added to the reaction flask; the temperature was set to 90° C.; and chloropropylmethyl-diisopropoxysilane (658 g) was added. The reaction mixture was stirred at 100° C. for one hour, and then cooled to room temperature.

A mixture of cyclohexane (2 L) and water (100 mL) was added to the room temperature reaction mixture. The mixture was stirred for several minutes, and then stirring was stopped. The layers were allowed to separate. The cyclohexane layer was decanted into a 6-L separatory funnel and washed twice with 1 L of 50% brine solution. The organic layer was removed, dried over magnesium sulfate and concentrated under reduced pressure to give a colorless oil. The compound was purified by Kugelrohr distillation at 180° C. for 2 hours to remove unreacted chloropropylmethyldiisopropoxysilane The yield of compound (I-1) was 745 g (89%). The desired structure of the product was confirmed by $^1H$ NMR spectroscopy, high performance liquid chromatography and gel permeation chromatography.

Example 2

Synthesis of the Aromatic Silicon-Containing Compound (I-6)

A 5-L three-necked flas was fitted with an argon inlet, mechanical stirrer and a thermometer, and was charged with isopropanol (1.6 L), dimethylformamide (600 mL) and potassium tert-butoxide (214 g). The reaction mixture was stirred at 50° C. for 10 minutes. 4-4'-(9-fluorenylidene)diphenol (334 g) was added to the reaction mixture; the temperature was raised to 70° C.; and the reaction mixture was stirred for 30 minutes, until the 4-4'-(9-fluorenylidene)diphenol was dissolved. The reaction mixture was then heated to 100° C. to rapidly distill off the isopropanol (boiling point 82° C.). Approximately 1 L of isopropanol was removed by this distillation.

An additional amount of dimethylformamide (1.4 L) was added to the reaction flask; the temperature was set to 90° C.; and chloropropylmethyl-diisopropoxysilane (477 g) was added. The reaction mixture was stirred at 100° C. for one hour, and then cooled to room temperature.

A mixture of cyclohexane (2 L) and water (100 mL) was added to the room temperature reaction mixture. The mixture was stirred for several minutes, and then stirring was stopped. The layers were allowed to separate. The cyclohexane layer was decanted into a 6-L separatory funnel and washed twice with 1 L of 50% brine solution. The organic layer was removed, dried over magnesium sulfate and filtered through silica gel (600 g), which was washed with 2% ethyl acetate in cyclohexane (1 L). The solvent was collected and concentrated under reduced pressure to give a colorless oil. The compound was purified by Kugelrohr distillation at 180° C. for 2 hours to remove unreacted chloropropylmethyldiisopropoxysilane. The yield of compound (I-6) was 612 g (85%). The desired structure of the product was confirmed by $^1$H NMR spectroscopy, high performance liquid chromatography and gel permeation chromatography.

Example 3

Synthesis of the Aromatic Silicon-Containing Compound (I-5)

A 5L 3-necked flask was fitted with an argon inlet, mechanical stirrer and thermometer, and then was charged with isopropanol (1.6 L), dimethylformamide (600 mL) and potassium tert-butoxide (368g). This reaction mixture was stirred at 50° C. for 10 minutes. 4,4'-cyclohexylidenebisphenol (400 g) was added to the reaction mixture, the temperature was raised to 70° C., and the reaction mixture was stirred for 30 minutes, until the 4,4'-cyclohexylidenebisphenol dissolved. The reaction mixture was then heated to 100° C. to rapidly distill off the isopropanol (b.p. 82° C.). Approximately 1L of isopropanol was removed by distillation.

Additional DMF (1.4 L) was added to the reaction flask, after which the temperature was set at 90° C., and chloropropylmethyldiisopropoxysilane (746 g) was added. The reaction was stirred at 100° C. for 1 hour, then cooled to room temperature.

A mixture of cyclohexane (2 L) and water (100 mL) was added to the room temperature reaction. This room temperature mixture was stirred for a few minutes. Then stirring was stopped, and the layers were allowed to separate. The cyclohexane layer was decanted into a 6 L separatory funnel and was washed with 50% brine solution (1 L, two times). The organic layer was removed, dried over magnesium sulfate) and filtered through silica gel (600 g), which was washed with cyclohexane (1 L). The cyclohexane was collected and concentrated under reduced pressure to give a colorless oil. The compound was purified by Kugelrohr distillation at 180° C. for 2 hours to remove unreacted chloropropylmethyldiisopropoxysilane. The yield of compound (I-6) was 612 g (85%). The desired structure of the product was confirmed by $^1$H NMR spectroscopy, high performance liquid chromatography and gel permeation chromatography.

Example 4

Large Scale Synthesis of Aromatic Silicon-Containing Compound (I-5)

A 50-gallon reactor is charged with 10 kg of dimethylformamide, and reactor agitation is begun. To the reactor, potassium tert-butoxide (8.7 kg) and isopropanol (30 kg) are added under nitrogen. The reactor is then charged with 4,4-cyclohexylidenebisphenol (9.4 kg); the temperature is increased to 70° C.; and the reaction mixture is held at 70° C. for 30 minutes, during which all solids should have dissolved and the solution should be clear. An additional amount of dimentylformamide (35 kg) is added, and the temperature is increased to 120° C. Isopropanol (25 kg) is removed by distillation.

After removal of the isopropanol, the reactor is cooled to 80° C., and chloropropylmethyldiisopropoxysilane (17.54 kg) is added to the reactor. The reaction temperature is increased to 107° C. for 1 hour, then cooled to room temperature. Once the reaction mixture reaches a temperature of 25° C., cyclohexane (40 g) is added, and this room temperature mixture was stirred for 30 minutes.

Stirring was stopped, and the slurry is passed through a bag-filter apparatus to capture the reaction solution. The reactor and bag-filters are rinsed with cyclohexane (10 kg). The reaction solution is then returned to the reactor, and water (5 kg) is added. Reactor agitation is begun at minimum, and continued for 5 minutes. After 5 minutes, agitation is stopped, and the layers were allowed to separate. The bottom layer is removed. Twice 50% brine solution (20 kg) is added to the reactor, the layers are allowed to separate, and the bottom layer is again removed. After the bottom layer is removed following the second brine wash, the reactor is charged with magnesium sulfate (10 kg) and silica gel (14 kg). The slurry is passed through a bag-filter apparatus, and the final product solution is pumped into the reactor, where volatile compounds are removed by vacuum distillation. The yield of compound (I-5) is 17.2 kg (73%). The desired structure of the product was confirmed by $^1$H NMR spectroscopy, high performance liquid chromatography and gel permeation chromatography.

Comparative Example 1

A conventional crosslinked siloxane-containing overcoat is prepared, i.e., without the aromatic silicon-containing compound.

Specifically, 11 parts of a hole transport molecule (III-1), 5.8 parts of binder material 1,6-bis(dimethoxymethylsilyl)-hexane, 1 part of hexamethylcyclotrisilane and 11 parts of methanol are mixed, and 2 parts of an ion exchange resin (AMBERLIST H15) are added thereto, followed by stirring for 2 hours. Furthermore, 32 parts of butanol and 4.92 parts of distilled water are added to this mixture, followed by stirring at room temperature for 30 minutes. Then, the resulting mixture is filtered to remove the ion exchange resin, and 0.180 parts of aluminum trisacetylacetonate ($Al(AcAc)_3$), 0.180 parts of acetylacetone (AcAc), 2 parts of a polyvinyl butyral resin (trade name: S-LEC KW-1, manufactured by Sekisui Chemical Co., Ltd.), 0.0180 parts of butylated-hydroxytoluene (BHT) and 0.261 parts of a hindered phenol antioxidant (IRGANOX 1010) are added to a filtrate obtained, and thoroughly dissolved therein for 2 hours to obtain a coating solution for a protective layer.

This coating solution is applied onto a charge transfer layer by dip coating (coating speed: about 170 mm/min), and dried by heating at 130° C. for one hour to form the protective layer having a film thickness of 3 μm, thereby obtaining a desired electrophotographic photoreceptor.

Examples 5-7

Crosslinked siloxane-containing outmost protective layers are prepared including an aromatic silicon-containing compound of formula (I). Specifically, the procedures of Comparative Example 1 are repeated, except that the aromatic silicon-containing compound of Examples 1, 2 and 5 are included. Specifically, the formulation and procedure are the same as Comparative Example 1 except the binder material 1,6-bis(dimethoxymethylsilyl)-hexane was changed to the aromatic silicon-containing compound (I-1), (I-6) and (I-5).

This coating solution is applied onto a photoreceptor with the same coating technique and parameters as described in Comparative Example 1.

The photoreceptors prepared in Comparative Example 1 and Examples 5-7 are tested for photoreceptor device evaluation. Specifically, the photoreceptors are tested for their electrical characteristics ($V_{high}$ and $V_{low}$), wear rate, and deletion resistance.

The electrical evaluation and wear testing and printing test of photoreceptors are performed by the following procedure:

The xerographic electrical properties of the above prepared photoconductive imaging member and other similar members can be determined by known means, including electrostatically charging the surfaces thereof with a corona discharge source until the surface potentials, as measured by a capacitively coupled probe attached to an electrometer, attained an initial value Vo of about −800 volts. After resting for 0.5 second in the dark, the charged members attained a surface potential of Vddp, dark development potential. Each member was then exposed to light from a filtered Xenon lamp thereby inducing a photodischarge which resulted in a reduction of surface potential to a Vbg value, background potential. The percent of photodischarge was calculated as 100×(Vddp−Vbg)/Vddp. The desired wavelength and energy of the exposed light was determined by the type of filters placed in front of the lamp. The monochromatic light photosensitivity was determined using a narrow band-pass filter. The photosensitivity of the imaging member is usually provided in terms of the amount of exposure energy in ergs/cm$^2$, designated as $E_{1/2}$, required to achieve 50 percent photodischarge from Vddp to half of its initial value. The higher the photosensitivity, the smaller is the $E_{1/2}$ value. The $E_{7/8}$ value corresponds to the exposure energy required to achieve ⅞ photodischarge from Vddp. The device was finally exposed to an erase lamp of appropriate light intensity and any residual potential (Vresidual) was measured. The imaging members were tested with an monochromatic light exposure at a wavelength of 780±10 nanometers and an erase light with the wavelength of 600 to 800 nanometers and intensity of 200 ergs.cm$^2$.

The devices were then mounted on a wear test fixture to determine the mechanical wear characteristics of each device. Photoreceptor wear was determined by the change in thickness of the photoreceptor before and after the wear test. The thickness was measured, using a permascope at one-inch intervals from the top edge of the coating along its length using a permascope, ECT-100. All of the recorded thickness values are averaged to obtain the average thickness of the entire photoreceptor device. For the wear test the photoreceptor was wrapped around a drum and rotated at a speed of 140 rpm. A polymeric cleaning blade is brought into contact with the photoreceptor at an angle of 20 degrees and a force of approximately 60-80 grams/cm. Single component toner is trickled on the photoreceptor at rate of 200 mg/min. The drum is rotated for 150 kcycle during a single test. The wear rate is equal to the change in thickness before and after the wear test divided by the # of kcycles.

Immediately after electrical cycling, the electrophotographic photoreceptors of each of Examples 5-7 and Comparative Example 1 were placed in a xerographic customer replacable unit (CRU), as is used in a DOCUCOLOR 1632 (manufactured by Xerox Corporation) and placed in such a machine for print testing.

Then, print tests were carried out on each photoreceptor. The tests were carried out under the same conditions of high temperature and high humidity (28° C. and 85% relative humidity), and the initial image quality and surface state of the electrophotographic photoreceptors and the image quality and surface state of the electrophotographic photoreceptors after 5,000 prints were determined.

The results show that all of the photoreceptors exhibit comparable electrical characteristics and wear rate, but the photoreceptors of Examples 5-7 exhibit significant improvement in image deletion resistance due to increased reduced elastic modulus and cleanability as compared to the photoreceptor of Comparative Example 1.

It will be appreciated that various of the above-discussed and other features and functions, or alternatives thereof, may be desirably combined into many other different systems or applications. Also that various presently unforeseen or unanticipated alternatives, modifications, or improvements therein may be subsequently made by those skilled in the art which are also intended to be encompassed by the following claims.

What is claimed is:

1. A method for preparing aromatic silicon-containing compounds, comprising:

providing an aromatic starting material;

reacting the aromatic starting material with a base to form an aromatic salt; and reacting the aromatic salt with a halo-alkylene-silane to form an aromatic silicon-containing compound, wherein the aromatic starting material is one or more compounds containing at least one moiety, the at least one moiety selected from the following;

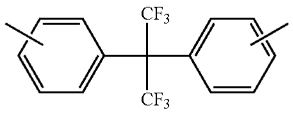
,

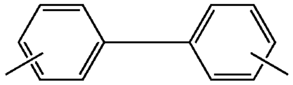
,

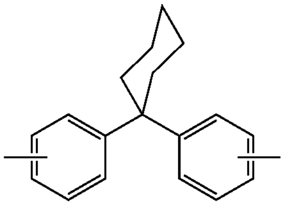
,

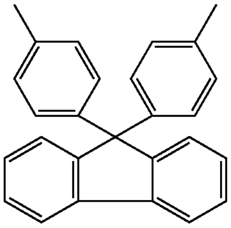
,

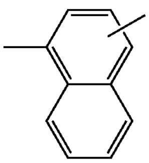
,

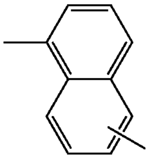
,

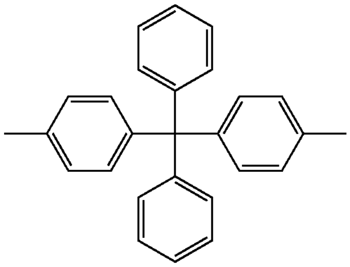
,

-continued
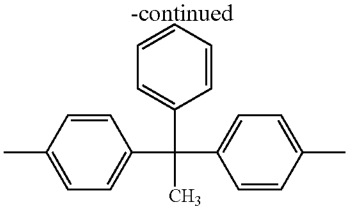
,
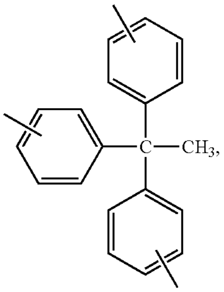
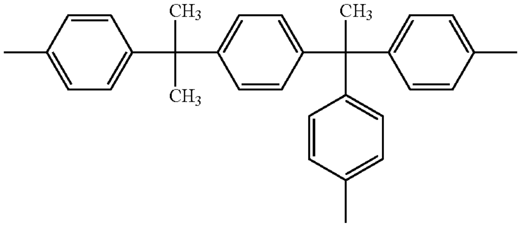
,
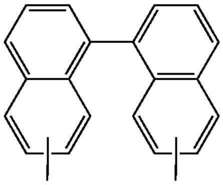
,
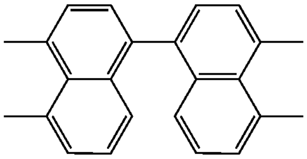
,
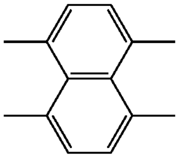
,
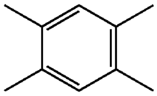
,
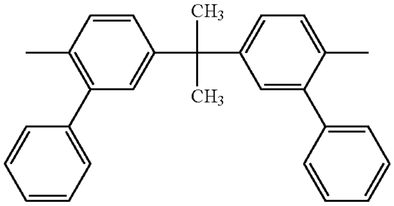
,
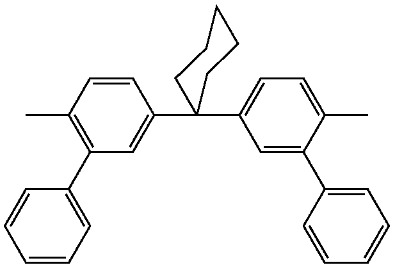
,
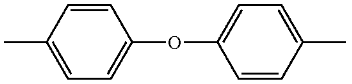
,
-continued
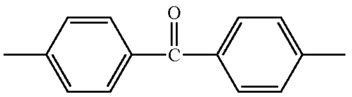
,
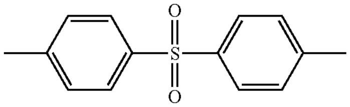
,
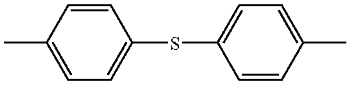
,
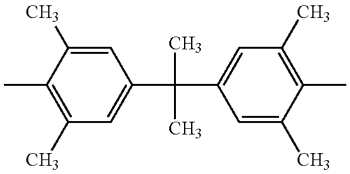
,
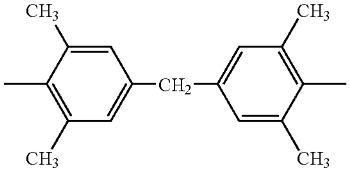
,
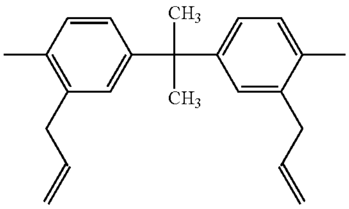
,
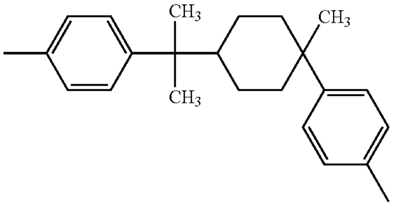
,
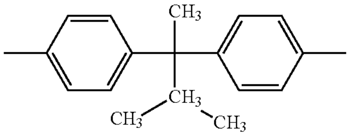
,
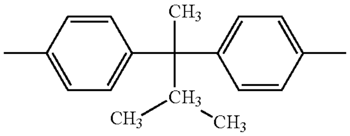
,
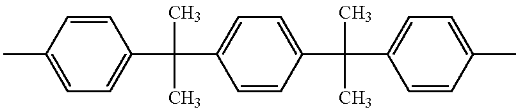
,
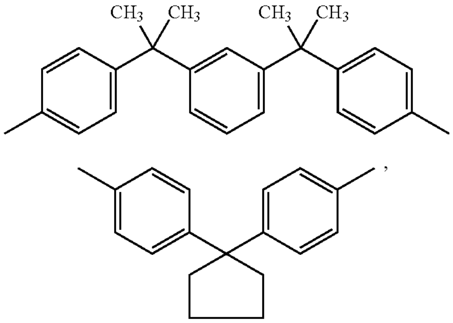

-continued

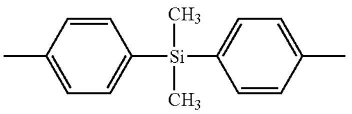
,

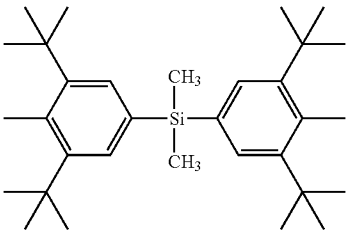
,

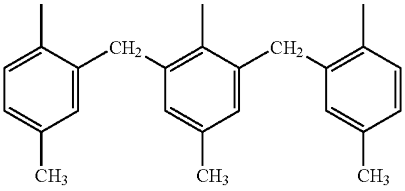
,

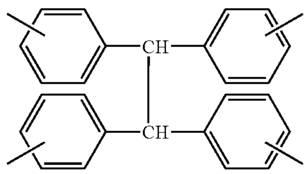
,

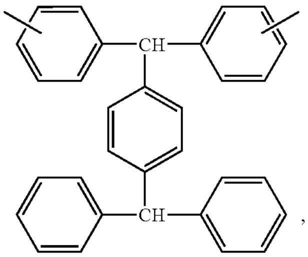
,

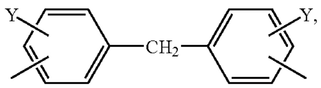

wherein Y is F, Cl, Br, $NO_2$,

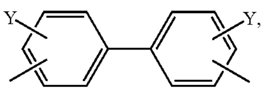

wherein Y is F, Cl, Br, $NO_2$

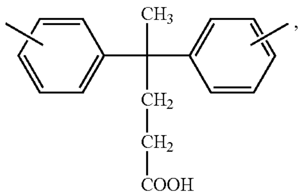
,

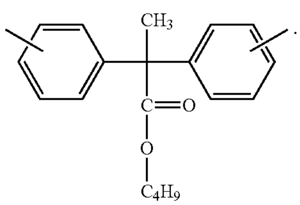
.

2. The method according to claim 1, wherein the one or more substituted aromatic compounds is 4,4'-cyclohexylidenebisphenol.

3. The method according to claim 1, wherein the base has a general formula MOR, in which O is oxygen, M is a metal atom chosen from the group consisting of potassium, sodium, lithium, calcium and magnesium, and R is a hydrogen atom or an alkyl group chosen from the group consisting of methyl, ethyl, n-propyl, isopropyl, n-butyl, isobutyl, tert-butyl, octyl and decyl groups.

4. The method according to claim 3, wherein the base is potassium tert-butoxide.

5. The method according to claim 1, wherein the aromatic starting material and the base are reacted in a mole ratio of about 1.0 moles of aromatic starting material : about 2.2 moles of base.

6. The method according to claim 1, wherein the reacting of the aromatic starting material with the base to form the aromatic salt is conducted in the presence of a first solvent.

7. The method according to claim 6, wherein the first solvent comprises one or more solvents chosen from alcohols, mixtures of alcohols and mixtures of alcohols and polar aprotic solvents.

8. The method according to claim 7, wherein the first solvent comprises a mixture of one or more alcohols chosen from methanol, ethanol, isopropanol, butanol, and mixtures thereof, and optionally one or more polar aprotic solvents chosen from dimethylformamide, dimethyl sulfoxide, acetone, ethyl acetate, tetrahydrofuran, methyl ethyl ketone and mixtures thereof.

9. The method according to claim 1, wherein the reacting of the aromatic starting material with the base to form the aromatic salt is conducted at a temperature of from about 0° C. to about 100° C.

10. The method according to claim 9, wherein the reacting of the aromatic starting material with the base to form the aromatic salt is conducted at a temperature of from about 50° C. to about 75° C.

11. The method according to claim 1, wherein the halo-alkylene-silane is representable by general formula (II)

$$Y\text{-}L\text{-}SiR_n(OR')_{3-n} \quad \text{(II)},$$

wherein Y is a halogen atom; L represents a divalent linking group; each R is independently chosen from hydrogen atom, lower alkyl groups and aryl groups; R' is independently chosen from lower alkyl groups; and n is chosen from 0, 1 and 2.

12. The method according to claim 11, wherein L is a divalent hydrocarbon group chosen from the group consisting of $-C_mH^{2m}-$, $-C_mH_{2m-2}-$, $-C_mH_{2m-4}-$, in which m is an integer of 1 to about 15, and combinations thereof, and wherein L may optionally have one or more substituent groups chosen from alkyl groups, phenyl groups, alkoxyl groups and amino groups.

13. The method according to claim 11, wherein each R and each R' is independently selected from hydrogen atom, methyl groups, ethyl groups, propyl groups, butyl groups, and pentyl groups, and isomers thereof.

14. The method according to claim 11, wherein the halo-alkylene-silane is chosen from the group consisting of fluoropropylmethyldiisopropoxysilane, chloropropylmethyldiisopropoxysilane, bromopropylmethyldiisopropoxysilane and iodopropylmethyldiisopropoxysilane, and mixtures thereof.

15. The method according to claim 1, wherein the reacting of the aromatic salt with the halo-alkylene-silane to form the aromatic silicon-containing compound is conducted in the presence of a second solvent.

16. The method according to claim 15, wherein the second solvent comprises one or more solvents chosen from alcohols, polar aprotic solvents and mixtures thereof.

17. The method according to claim 15, wherein the second solvent is one or more solvents chosen from methanol, ethanol, isopropanol, butanol, dimethylformamide, dimethyl sulfoxide, acetone, ethyl acetate, tetrahydrofuran, methyl ethyl ketone and mixtures thereof.

18. The method according to claim 1, wherein the reacting of the aromatic salt with the halo-alkylene-silane to form the aromatic silicon-containing compound is conducted at a temperature of from about 25° C. to about 120° C.

19. The method according to claim 18, wherein the reacting of the aromatic salt with the halo-alkylene-silane to form the aromatic silicon-containing compound is conducted at a temperature of from about 80° C. to about 110° C.

20. The method according to claim 1, further comprising purifying the aromatic salt.

21. The method according to claim 1, further comprising purifying the aromatic silicon-containing compound.

22. The method according to claim 1, wherein the at least one moiety is selected from the group consisting of the following:

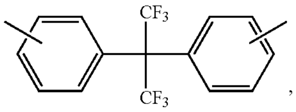

,

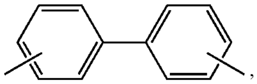

,

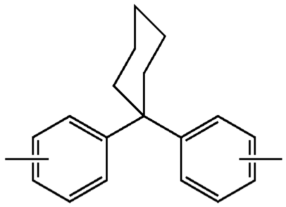

,

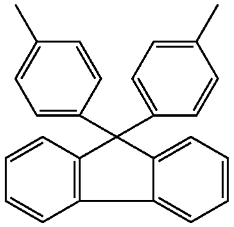

,

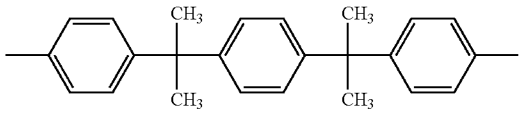

, and

-continued

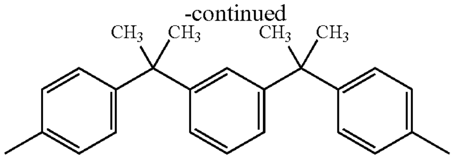

.

23. The method according to claim 1, wherein the at least one moiety is

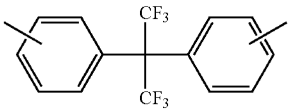

.

24. The method according to claim 1, wherein the at least one moiety is

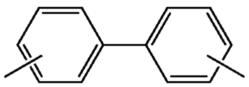

.

25. The method according to claim 1, wherein the at least one moiety is

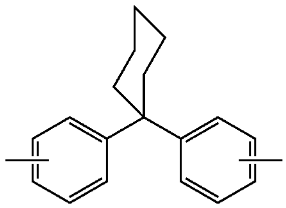

.

26. The method according to claim 1, wherein the at least one moiety is

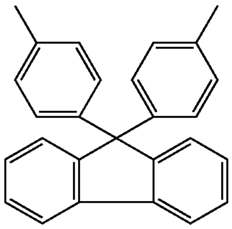

.

* * * * *